(12) United States Patent
Yamashiro et al.

(10) Patent No.: US 9,824,510 B2
(45) Date of Patent: Nov. 21, 2017

(54) VEHICLE OPERATION SENSING SYSTEM, VEHICLE OPERATION SENSING UNIT, AND VEHICLE OPERATION SENSING DEVICE

(71) Applicant: DENSO CORPORATION, Kariya, Aichi-pref. (JP)

(72) Inventors: Takahisa Yamashiro, Kariya (JP); Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 4 days.

(21) Appl. No.: 14/889,275

(22) PCT Filed: Apr. 23, 2014

(86) PCT No.: PCT/JP2014/002274
§ 371 (c)(1),
(2) Date: Nov. 5, 2015

(87) PCT Pub. No.: WO2014/181513
PCT Pub. Date: Nov. 13, 2014

(65) Prior Publication Data
US 2016/0086395 A1    Mar. 24, 2016

(30) Foreign Application Priority Data

May 8, 2013  (JP) .................................. 2013-098729
Feb. 27, 2014  (JP) .................................. 2014-037050

(51) Int. Cl.
*G01P 15/00* (2006.01)
*G07C 5/08* (2006.01)
(Continued)

(52) U.S. Cl.
CPC ................ *G07C 5/08* (2013.01); *B60K 37/06* (2013.01); *B60K 2350/928* (2013.01);
(Continued)

(58) Field of Classification Search
CPC .................................. G07C 5/08; G01P 15/00
See application file for complete search history.

(56) References Cited

U.S. PATENT DOCUMENTS

2012/0083705 A1\* 4/2012 Yuen .................... A61B 5/0002
 600/508
2012/0166072 A1 6/2012 Tamaoki et al.
2013/0006675 A1\* 1/2013 Bowne ............... G06Q 10/0639
 705/4

FOREIGN PATENT DOCUMENTS

JP 2007334479 A 12/2007
JP 2012141655 A 7/2012
(Continued)

OTHER PUBLICATIONS

International Search Report and Written Opinion (in Japanese with English Translation) for PCT/JP2014/002274, dated Jun. 3, 2014; ISA/JP.

*Primary Examiner* — Yonel Beaulieu
*Assistant Examiner* — Martin Weeks
(74) *Attorney, Agent, or Firm* — Harness, Dickey & Pierce P.L.C.

(57) ABSTRACT

A vehicle operation sensing system includes an operation sensor, a fixture sensor, and a vehicle operation sensing unit. The operation sensor is an acceleration sensor fixed to an operation member, and sensing an acceleration generated in the operation member at least in a gravitational acceleration direction. The operation member has one end fixed to a vehicle and the other end a position of which is displaced in the gravitational acceleration direction when the operation member is operated. The fixture sensor is an acceleration sensor used at a position unchanging part of the vehicle, and sensing an acceleration generated in the vehicle at least in the gravitational acceleration direction. The vehicle operation sensing unit has an operation sensing part sensing an (Continued)

operation of the operation member by using a sensing result of the fixture sensor as an object to be compared with a sensing result of the operation sensor.

14 Claims, 20 Drawing Sheets

(51) Int. Cl.
 *G01P 15/18* (2013.01)
 *B60K 37/06* (2006.01)
 *B60Q 1/14* (2006.01)
(52) U.S. Cl.
 CPC ....... *B60Q 1/1469* (2013.01); *B60W 2540/20* (2013.01); *G01P 15/00* (2013.01); *G01P 15/18* (2013.01)

(56) References Cited

FOREIGN PATENT DOCUMENTS

| | | |
|---|---|---|
| WO | WO-2008120290 A1 | 10/2008 |
| WO | WO-2012124045 A1 | 9/2012 |

\* cited by examiner

MOBILE ACCELERATION SENSOR 32     LEVER ACCELERATION SENSOR 21

MOBILE ACCELERATION SENSOR 32　　　　LEVER ACCELERATION SENSOR 21

MOBILE BASE ACCELERATION a2s　　　　LEVER BASE ACCELERATION a1s
(GRAVITATIONAL ACCELERATION)　　　　(GRAVITATIONAL ACCELERATION)

⇩　　INCLINATION OF OWN VEHICLE　　⇩

MOBILE REAL ACCELERATION　　　　LEVER REAL ACCELERATION
(GRAVITATIONAL ACCELERATION)　　(GRAVITATIONAL ACCELERATION)

$\theta mo1 = \theta le1$

VEHICLE OPERATION SENSING SYSTEM, VEHICLE OPERATION SENSING UNIT, AND VEHICLE OPERATION SENSING DEVICE

CROSS REFERENCE TO RELATED APPLICATIONS

This application is a U.S. National Phase Application under 35 U.S.C. 371 of International Application No. PCT/JP2014/002274 filed on Apr. 23, 2014 and published in Japanese as WO 2014/181513 A1 on Nov. 13, 2014. This application is based on and claims the benefit of priority from Japanese Patent Application No. 2013-098729 filed on May. 8, 2013 and Japanese Patent Application No. 2014-037050 filed on Feb. 27, 2014. The entire disclosures of all of the above applications are incorporated herein by reference.

TECHNICAL FIELD

The present disclosure relates to a vehicle operation sensing system for sensing an operation of an operation member fixed to a vehicle, and a vehicle operation sensing unit and a vehicle operation sensing device which are included in the vehicle operation sensing system.

BACKGROUND ART

There has been known a technique for determining whether or not an operation is to be assisted on the basis of a sensing result of an operating state of an operation member fixed to a vehicle. For example, in Patent Literature 1 is disclosed to an operation assistance device a technique for outputting a state in which a winker relay operatively connected to the operation of a winker lever is energized or de-energized and for starting operation assistance when the operation assistance device determines that a turn signal lamp is on.

PRIOR ART LITERATURE

Patent Literature

[Patent Literature 1] JP 2012-141655 A

SUMMARY OF THE INVENTION

In the technique disclosed in Patent Literature 1, in order to determine whether the turn signal lamp is on or off, the operation assistance device needs to receive an input of a signal from a winker relay. Hence, in the case where a user retrofits the operation assistance device to a vehicle, it takes the user time and effort to perform wiring for receiving the input of the signal. Further, in the case where the standard of the signal varies from one maker to another, an operation assistance device according to the maker needs to be prepared.

The following construction is considered as a means for solving the problem described above: that is, an acceleration sensor for sensing an acceleration is fixed to a winker lever and whether the turn signal lamp is on or off is determined on the basis of a sensing result of the acceleration sensor. Specifically, a construction can be considered in which by using the fact that a gravitational acceleration at a tip end of a winker lever varies according to an operation position of a winker lever, whether the turn signal lamp is on or off is determined on the basis of a sensing result of the acceleration sensor. According to this construction, it is not necessary to use the signal of the winker relay and hence the abovementioned problem can be solved.

However, in the abovementioned construction employing the acceleration sensor, the sensing result of the acceleration sensor includes not only the gravitational acceleration but also an acceleration based on the motion of the vehicle itself. Hence, depending on the running state of the vehicle, it is possible that the operation of the winker lever cannot be sensed with high accuracy on the basis of the sensing result of the acceleration sensor.

The object of the present disclosure is to provide a vehicle operation sensing system, a vehicle operation sensing unit, and a vehicle operation sensing device that can sense an operation of an operation member of a vehicle with higher accuracy by the use of an acceleration sensor fixed to the operation member.

According to a first aspect of the present disclosure, a vehicle operation sensing system includes: an operation sensor as an acceleration sensor that is fixed to an operation member and that senses an acceleration generated in the operation member at least in a gravitational acceleration direction and that has two or more axes, the operation member having one end fixed to a vehicle and the other end a position of which is displaced in the gravitational acceleration direction when the operation member is operated about the one end as a fulcrum from a position when the operation member is not operated; a fixture sensor that is used at a position unchanging part of the vehicle and that senses an acceleration generated in the vehicle at least in the gravitational acceleration direction and that has two or more axes; and a vehicle operation sensing unit that has an operation sensing part sensing an operation of the operation member by using a sensing result of the fixture sensor for an object to be compared with a sensing result of the operation sensor.

According to this, there are used not only the acceleration sensor (that is, the operation sensor) that senses the acceleration at least in the gravitational acceleration direction, which is generated in the operation member, and that has two or more axes but also a sensing result of the acceleration sensor (that is, the fixture sensor) that senses the acceleration at least in the gravitational acceleration direction, which is generated in the vehicle, and that has two or more axes. Here, each of the operation sensor and the fixture sensor is an acceleration sensor that senses at least the acceleration in the gravitational acceleration direction and that has two or more axes, so the acceleration vector as a sensing result of each of the operation sensor and the fixture sensor expresses an acceleration component other than a gravitational acceleration.

Hence, by using the sensing result of the fixture sensor as an objected to be compared with the sensing result of the operation sensor, the effect of an acceleration component caused by the behavior of the vehicle can be reduced and a difference in the gravitational acceleration between them can be compared with each other. Hence, it is possible to reduce the acceleration component caused by the behavior of the vehicle and to sense the operation of the operation member by the operation sensing part with higher accuracy.

As a result, the operation of the operation member can be sensed with higher accuracy on the basis of the sensing result of the acceleration generated according to the operation of the operation member by the acceleration sensor fixed to the operation member of the vehicle.

According to a second aspect of the present disclosure, a vehicle operation sensing unit includes: an operation sensing part sensing an operation of an operation member by using a sensing result by an operation sensor and a sensing result by a fixture sensor as objects to be compared, wherein the operation sensor is an acceleration sensor that is fixed to the operation member and that senses an acceleration generated in the operation member at least in a gravitational acceleration direction and that has two or more axes, the operation member having one end fixed to a vehicle and the other end a position of which is displaced in the gravitational acceleration direction when the operation member is operated about the one end as a fulcrum from a position when the operation member is not operated, and wherein the fixture sensor is an acceleration sensor that is used at a position unchanging part of the vehicle and that senses an acceleration generated in the vehicle at least in the gravitational acceleration direction and that has two or more axes.

According to a third aspect of the present disclosure, a vehicle operation sensing device includes: an operation sensor as an acceleration sensor that is fixed to an operation member and that senses an acceleration generated in the operation member at least in a gravitational acceleration direction and that has two or more axes, the operation member having one end fixed to a vehicle and the other end a position of which is displaced in the gravitational acceleration direction when the operation member is operated about the one end as a fulcrum from a position when the operation member is not operated; and an operation sensing part sensing an operation of the operation member by using a sensing result, which is sensed by a fixture sensor as an acceleration sensor that is used at a position unchanging part of the vehicle and that senses an acceleration generated in the vehicle at least in a gravitational acceleration direction and that has two or more axes, as an object to be compared with a sensing result sensed by the operation sensor.

As described above, also in the vehicle operation sensing unit and the vehicle operation sensing device, the sensing result of the fixture sensor that senses the acceleration in the gravitational acceleration direction, which is generated in the vehicle, and that has two or more axes is used as the object to be compared with the sensing result of the operation sensor that senses the acceleration in the gravitational acceleration direction, which is generated in the operation member, and that has two or more axes. Hence, the operation of the operation member can be sensed with higher accuracy on the basis of the sensing result of the acceleration generated according to the operation of the operation member by the acceleration sensor fixed to the operation member of the vehicle.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereinafter, embodiments of the present disclosure will be described by the use of drawings.
(Embodiment 1)

Figure 1:
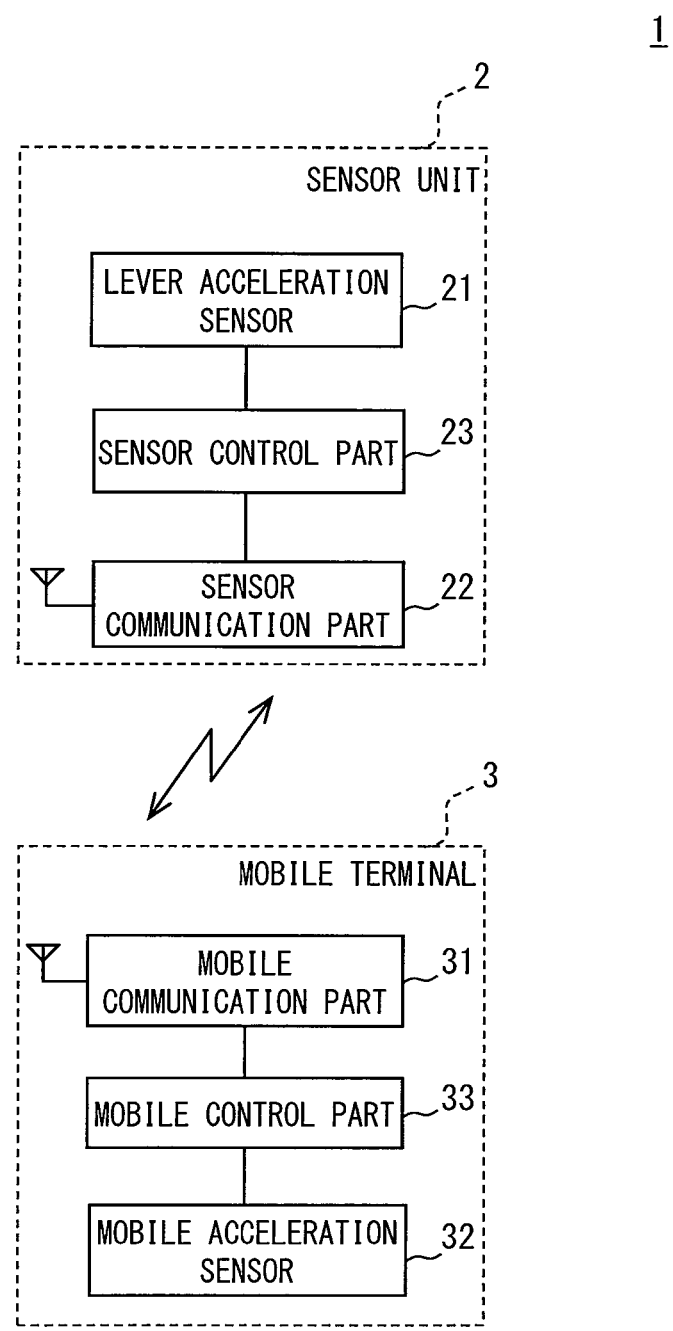
FIG. 1 is a diagram to show an example of a general construction of a vehicle operation sensing system 1.

FIG. 1 is a diagram to show an example of a general construction of a vehicle operation sensing system 1 to which the present disclosure is applied. The vehicle operation sensing system 1 senses the position of a winker lever 5 used in a vehicle and has a sensor unit 2 and a mobile terminal 3, as shown in FIG. 1. Hereinafter, a vehicle using the vehicle operation sensing system 1 is referred to as an own vehicle. Here, the mobile terminal 3 corresponds to a vehicle operation sensing device and the winker lever 5 corresponds to an operation member.
<General Construction of the Vehicle Operation Sensing System 1>

The sensor unit 2 is fixed to the winker lever 5 of the own vehicle. The winker lever 5 is an operation member to light a winker lamp and to indicate the direction of the own vehicle to surroundings when the own vehicle turns left or right or changes a course and is also referred to as a turn signal switch or a turn signal lever in some cases.

Figure 2:
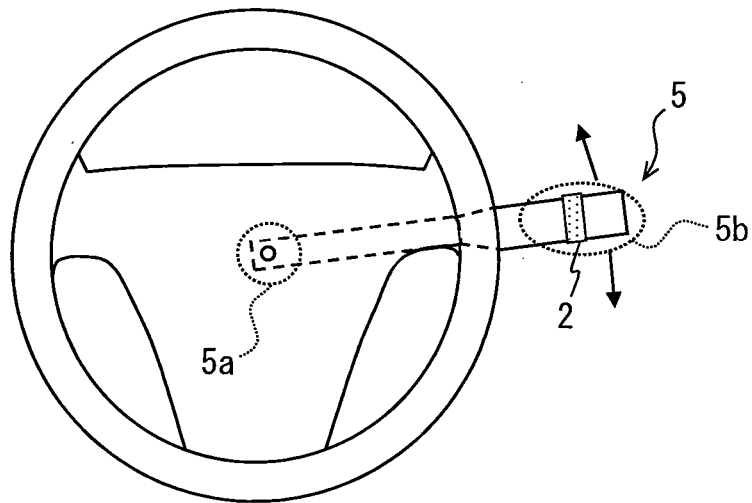
FIG. 2 is a schematic diagram to show a position in which a sensor unit 2 is fixed.

The winker lever 5 has a fixed end 5a fixed to the vehicle (see FIG. 2) and a tip end 5b as the other end and is provided in such a way as to swing in a lever turning direction about the fixed end 5a as a flucrum (see FIG. 2). A direction in which the tip portion 5b is moved when the winker lever 5 is turned is a direction including a vertical component (that is, a component in a gravitational acceleration direction). Further, the winker lever 5 is mounted in such a way that its movable range is less than several tens degrees.

A stationary position of the winker lever 5 in which the position of the tip portion 5b of the winker lever 5 is not changed even if a driver releases his hand includes: a neutral position in which the driver does not make an operation of lighting the winker lamp; a left lighting position in which when the driver turns the vehicle to the left or changes a course to a left direction, the driver lights a left winker lamp; and a right lighting position in which when the driver turns the vehicle to the right or changes a course to a right direction, the driver lights a right winker lamp. The neutral position corresponds to a position when an operation is not made, whereas the right lighting position and the left lighting position correspond to a plurality of operation positions.

The sensor unit 2, as shown in FIG. 2, is fixed to the tip portion 5b of the winker lever 5 shaped like a stick extending from a steering column of the vehicle. The sensor unit 2 may be so constructed as to be fixed to the winker lever 5 in such a way as not to be attached and detached, but may be so constructed as to be removably attached to the winker lever 5 in such a way that it can be used even if the driver changes the vehicle as in the case of car sharing. The sensor unit 2 is fixed to the tip portion 5b of the winker lever 5, so that as the position of the tip portion 5b of the winker lever 5 is displaced by the operation of the winker lever 5, the position of the sensor unit 2 is also displaced.

Returning to FIG. 1, the mobile terminal 3 is a multi-functional mobile phone such as a smart phone and senses an acceleration generated in the terminal itself. It is assumed that the mobile terminal 3 is placed at a part where the own vehicle does not have its position changed (hereinafter referred to as "a position unchanging part") or is fixed by a holder case set at the position unchanging part, whereby the mobile terminal 3 is moved along with the own vehicle. Hence, an acceleration generated in the mobile terminal 3 can be identified with an acceleration generated in the own vehicle.
<Detailed Construction of the Sensor Unit 2>

The sensor unit 2 includes a lever acceleration sensor 21, a sensor communication part 22, and a sensor control part 23. The lever acceleration sensor 21, the sensor communication part 22, and the sensor control part 23 are assumed to be supplied with electric power from a battery built in the sensor unit 2. Further, the lever acceleration sensor 21, the sensor communication part 22, and the sensor control part 23 may be so constructed as to be supplied with electric power from an external power source of the sensor unit 2 such as a cigarette power source of the vehicle. From the viewpoint of reducing the size of the sensor unit 2 and eliminating the labor of wiring and the like, it is also recommended to employ a construction of using a built-in battery.

The lever acceleration sensor 21 is a sensor for sensing an acceleration. The lever acceleration sensor 21 corresponds to an operation sensor. The sensor unit 2 is fixed to the tip portion 5b of the winker lever 5, so the lever acceleration sensor 21 sequentially senses an acceleration generated at the tip portion 5b of the winker lever 5. For example, the lever acceleration sensor 21 is assumed to be a three-axis acceleration sensor for sensing accelerations at three axes orthogonal to each other.

In the case where the own vehicle is parked, the lever acceleration sensor 21 senses only gravitational accelerations corresponding to three kinds of positions of a neutral position, a right lighting position, and a left lighting position of the winker lever 5. The tip portion 5b of the winker lever 5 is moved in a turning direction with a center at the fixed end 5a. Hence, angles formed by the respective axes of the lever acceleration sensor 21, which is fixed to the tip portion 5b of the winker lever 5, and by a vertical direction become angles different from each other at the neutral position, the right lighting position, and the left lighting position. Hence, the gravitational accelerations applied to the respective axes of the lever acceleration sensor 21 while the own vehicle is parked are different in magnitude from each other at the neutral position, the right lighting position, and the left lighting position.

In this regard, in the case where the own vehicle is running, the lever acceleration sensor 21 senses accelerations of the sums of an acceleration component caused by the behavior of the own vehicle and the gravitational accelerations corresponding to three kinds of positions of the neutral position, the right lighting position, and the left lighting position.

The sensor communication part 22 has a transmitting and receiving antenna and makes communication according to the standard of Bluetooth (trade mark) with the mobile terminal 3 of the own vehicle, thereby transmitting and receiving information.

The sensor control part 23 is constructed as a conventional computer and has a well-known CPU, a memory such as a ROM, a RAM, and an EEPROM, an I/O, and a bus line for connecting these components (all of which are not shown in the drawing) built therein. In the sensor control part 23, the CPU executes programs stored previously in the ROM on the basis of various kinds of information inputted from the lever acceleration sensor 21 and the sensor communication part 22, thereby performing various kinds of processing.

Here, some or all of functions performed by the sensor control part 23 may be constructed in terms of hardware by one IC or a plurality of ICs.

Figure 3:
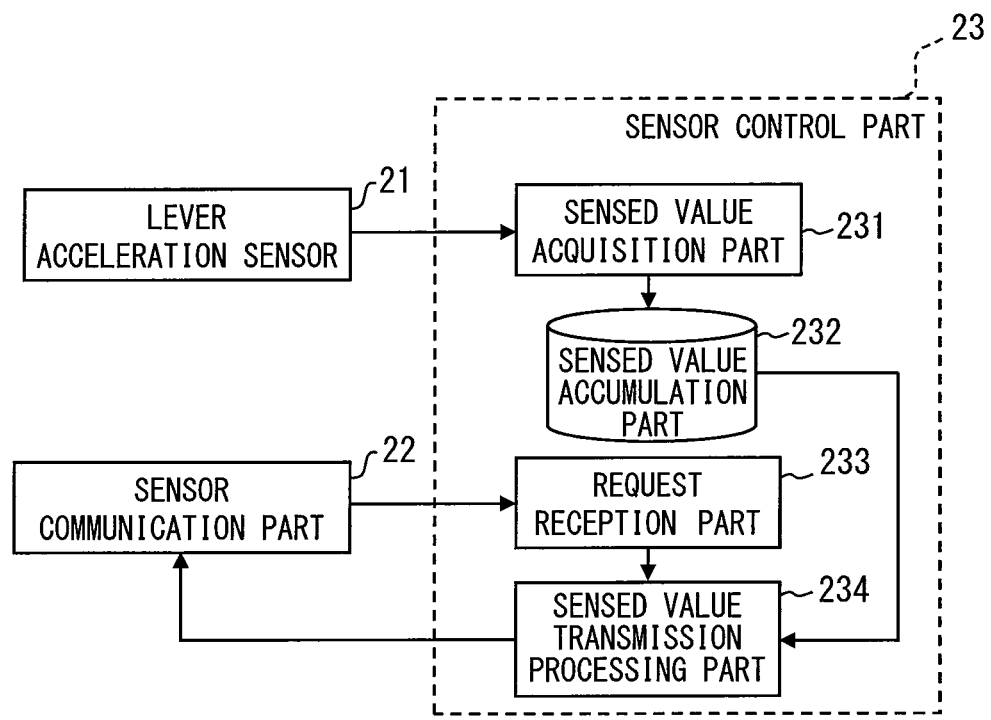
FIG. 3 is a function block diagram to show an example of a general construction of a sensor control part 23.

As shown in FIG. 3, the sensor control part 23 has a sensed value acquisition part 231, a sensed value accumulation part 232, a request reception part 233, and a sensed value transmission processing part 234.

<Processing in the Sensor Control Part 23>

The sensed value acquisition part 231 sequentially acquires a sensed value of an acceleration sequentially outputted from the lever acceleration sensor 21. The sensed value is an acceleration vector (hereinafter referred to as "a lever acceleration") composed of accelerations of the respective axes of the lever acceleration sensor 21. The sensed value acquisition part 231 accumulates the acquired lever acceleration in the sensed value accumulation part 232.

In the case where the sensed value acquisition part 231 accumulates the acquired lever acceleration in the sensed value accumulation part 232, the sensed value acquisition part 231 accumulates the acquired lever acceleration in such a way that a time stamp of the lever acceleration is linked with the acquired lever acceleration. Further, the sensed value accumulation part 232 may be constructed in such a way that in the case where the acquired lever acceleration is more than a memory capacity assigned thereto, the lever acceleration is erased in ascending order of time.

The request reception part 233 receives a transmission request (which will be described later) transmitted from a mobile communication part 31 of the mobile terminal 3 via the sensor communication part 22.

In the case where the request reception part 233 receives the transmission request from the mobile terminal 3, the sensed value transmission processing part 234 reads out the lever accelerations of last plural times accumulated in the sensed value accumulation part 232. Then, the sensed value transmission processing part 234 calculates a moving average value of the read-out lever accelerations of the last plural times and makes the sensor communication part 22 transmit the calculated moving average value as a lever acceleration of the winker lever 5.

Here, in place of a construction in which the sensed value transmission processing part 234 makes the sensor communication part 22 transmit the abovementioned moving average value as a lever acceleration, it is also recommended to employ a construction in which the lever acceleration of the last one time accumulated in the sensed value accumulation part 232 is transmitted as a lever acceleration of the winker lever 5 from the sensor communication part 22.

In the case where the lever acceleration is transmitted from the sensor communication part 22, the lever acceleration is transmitted with also a time stamp corresponding to the lever acceleration attached thereto. In the case of the construction in which the abovementioned moving average value is used as the lever acceleration, it is recommended to employ a construction in which the lever acceleration is transmitted, for example, with a time stamp corresponding to the lever acceleration of the last one time accumulated in the sensed value accumulation part 232 attached thereto.

Here, for the purpose of reducing power consumption, it is assumed to be a default that the sensed value transmission processing part 234 does not make the sensor transmission part 22 transmit the lever acceleration except the case where a transmission request is made from the mobile terminal 3.

<Detailed Construction of the Mobile Terminal 3>

The mobile terminal 3, as described above, senses the acceleration generated at the terminal itself and senses the position of the winker lever 5 by the use of the acceleration sensed by the terminal itself and the acceleration sensed by the sensor unit 2. The mobile terminal 3, as shown in FIG. 1, includes a mobile communication part 31, a mobile acceleration sensor 32, and a mobile control part 33.

The mobile communication part 31 has a transmitting and receiving antenna and makes communication according to the standard of Bluetooth with the sensor unit 2 of the own vehicle, thereby transmitting and receiving information. Here, in the present embodiment is shown a construction in which communication between the mobile terminal 3 and the sensor unit 2 is made according to the standard of Bluetooth, but a construction is not limited to this construction. For example, it is also recommended to employ a construction in which the communication between the mobile terminal 3 and the sensor unit 2 is made by wireless communication according to a near field wireless standard such as ZigBee (trademark) or a wireless LAN standard such as IEEE802 or a construction in which the communication is made by wired communication such as USB communication.

The mobile acceleration sensor 32 is a sensor which is built in the mobile terminal 3 and which senses an acceleration generated in the mobile terminal 3. For example, the mobile acceleration sensor 32 is assumed to be a three-axis acceleration sensor for sensing accelerations in three axes orthogonal to each other.

The mobile terminal 3 having the mobile acceleration sensor 32 built therein, as described above, is set or fixed at the position unchanging part, thereby being moved along with the own vehicle. Hence, it can be said that the mobile acceleration sensor 32 senses an acceleration generated in the own vehicle. Here, the mobile acceleration sensor 32 corresponds to a fixture sensor. It is assumed that even if the mobile terminal 3 is placed or fixed in the place in which the position is not changed, the mobile terminal 3 is not moved in the vehicle even if the own vehicle is running or is parked.

The mobile acceleration sensor 32 does not have its position moved in the vehicle, which is different from the lever accelerator sensor 21, so the mobile acceleration sensor 32 senses only the gravitational acceleration according to a position (that is, inclination) when the mobile terminal 3 is placed in the vehicle. Further, in the case where the own vehicle is running, the mobile acceleration sensor 32 senses an acceleration which is the sum of the gravitational acceleration according to a place where the mobile terminal 3 is placed in the own vehicle and an acceleration component generated by the behavior of the own vehicle.

The mobile control part 33 is constructed as a conventional computer and has: a well-known CPU; a memory such as a ROM, a RAM, and an EEPROM; an I/O; and a bus line for connecting these components (all of which are not shown in the drawing) built therein. The mobile control part 33 corresponds to a vehicle operation sensing unit. In the mobile control part 33, the CPU executes a program previously stored in the ROM on the basis of various kinds of information inputted from the mobile communication part 31 and the mobile acceleration sensor 32, thereby performing various kinds of processing.

Here, some or all of functions performed by the mobile control part 33 may be constructed in terms of hardware of one IC or several ICs.

Figure 4:
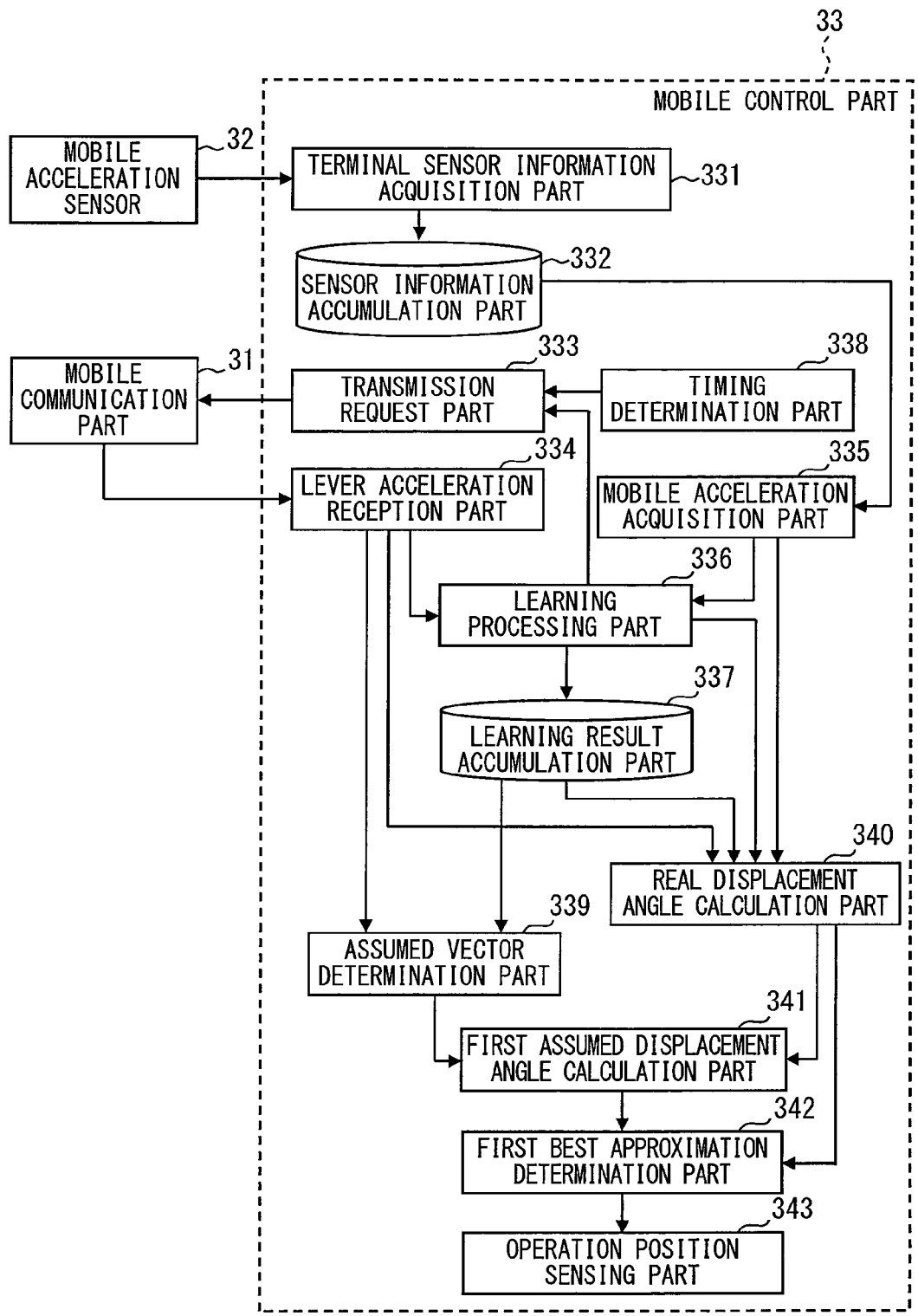
FIG. 4 is a function block diagram to show an example of a general construction of a mobile control part 33 in a first embodiment.

As shown in FIG. 4, the mobile control part 33 has a terminal sensor information acquisition part 331, a sensor information accumulation part 332, a transmission request part 333, a lever acceleration reception part 334, a mobile acceleration acquisition part 335, a learning processing part 336, a learning result acquisition part 337, a timing determination part 338, an assumed vector determination part 339, a real displacement angle calculation part 340, a first assumed displacement angle calculation part 341, a first best approximation determination part 342, and an operation position sensing part 343.

The sensor information accumulation part 332 and the learning result acquisition part 337 are electrically rewritable memories such as RAM and EEPROM. Here, for the sake of convenience, of a construction relating to a function included by an ordinary multi-functional mobile phone, a construction not necessary for describing the present embodiment will be omitted in description.

<Processing by the Mobile Control Part 33>

The terminal sensor information acquisition part 331 accumulates the sensed value of the acceleration, which is sensed sequentially by the mobile acceleration sensor 32, in the sensor information accumulation part 332. This sensed value is an acceleration vector (hereinafter referred to as "a mobile acceleration") made of accelerations of respective axes of the mobile acceleration sensor 32.

In the case where the terminal sensor information acquisition part 331 accumulates the mobile acceleration in the sensor information accumulation part 332, the terminal sensor information acquisition part 331 accumulates the mobile acceleration in such a way that a time stamp is linked with the mobile acceleration. Further, in the case where the volume of the mobile acceleration is more than an allotted memory capacity, the sensor information accumulation part 332 may be so constructed as to erase the mobile acceleration in an ascending order of the time stamp. In addition, the sensor information accumulation part 332 may be so constructed as to erase the mobile acceleration in which a specified time passes after it is stored.

The transmission request part 333 transmits a transmission request to the sensor unit 2 via the mobile communication part 31, the transmission request making a request of the sensor unit 2 to transmit the lever acceleration. When the mobile terminal 3 transmits the transmission request, that is, makes a transmission request, the sensor unit 2 transmits the lever acceleration at the lever acceleration sensor 21 and its time stamp.

The lever acceleration reception part 334 performs lever acceleration reception processing of receiving the lever acceleration and its time stamp, which are transmitted from the sensor communication part 22 of the sensor unit 2, via the mobile communication part 31.

The mobile acceleration acquisition part 335 performs mobile acceleration acquisition processing of reading and acquiring the mobile acceleration accumulated in the sensor information accumulation part 332. The mobile acceleration acquisition part 335 reads and acquires the mobile acceleration linked with a time stamp closest to the time stamp of the lever acceleration received by the lever acceleration reception part 334.

Here, in the case of employing a construction using the moving average value described above as the lever acceleration, it is recommended to employ the following. First, the mobile acceleration acquisition part 335 reads a plurality of mobile accelerations including a mobile acceleration linked with the time stamp closest to the time stamp of the lever acceleration received by the lever acceleration reception part 334. In more detail, the mobile acceleration acquisition part 335 reads the plurality of mobile accelerations going back in a chronological order from the mobile acceleration linked with the time stamp closest to the time stamp of the lever acceleration. The plurality referred to here is equal to the number of samples when the moving average value is calculated by the sensed value transmission processing part 234 of the sensor unit 2. The mobile acceleration acquisition part 335 calculates a moving average value of the plurality of read mobile accelerations and acquires the calculated moving average value as the mobile acceleration.

<Learning Processing in the Embodiment 1>

Subsequently, learning processing performed by the learning processing part 336 will be described by the use of a flow chart shown in FIG. 5. The learning processing is initial setting processing performed in advance so as to make it possible to sense the position of the winker lever 5 when the vehicle operation sensing system 1 starts to be used, the initial setting processing including again fixing the sensor unit 2 to the winker lever 5 and changing a place where the mobile terminal 3 is placed in the own vehicle. In the learning processing, the mobile acceleration and the lever acceleration when the winker lever 5 is at a neutral position under the same condition, for example, when the own vehicle is parked are stored, and also a displacement vector of the lever acceleration in the case where the winker lever 5 is changed from the neutral position to a left lighting position or to a right lighting position under the same condition is stored. In the present embodiment, the following description will be made by taking a case where the learning processing is performed while the own vehicle is parked as an example.

Further, although described in detail later, three sensing axes of the lever acceleration sensor 21 included by the sensor unit 2 and three sensing axes of the mobile acceleration sensor 32 included by the mobile terminal 3 do not need to be identical to each other in the directions of three axes.

Figure 5:
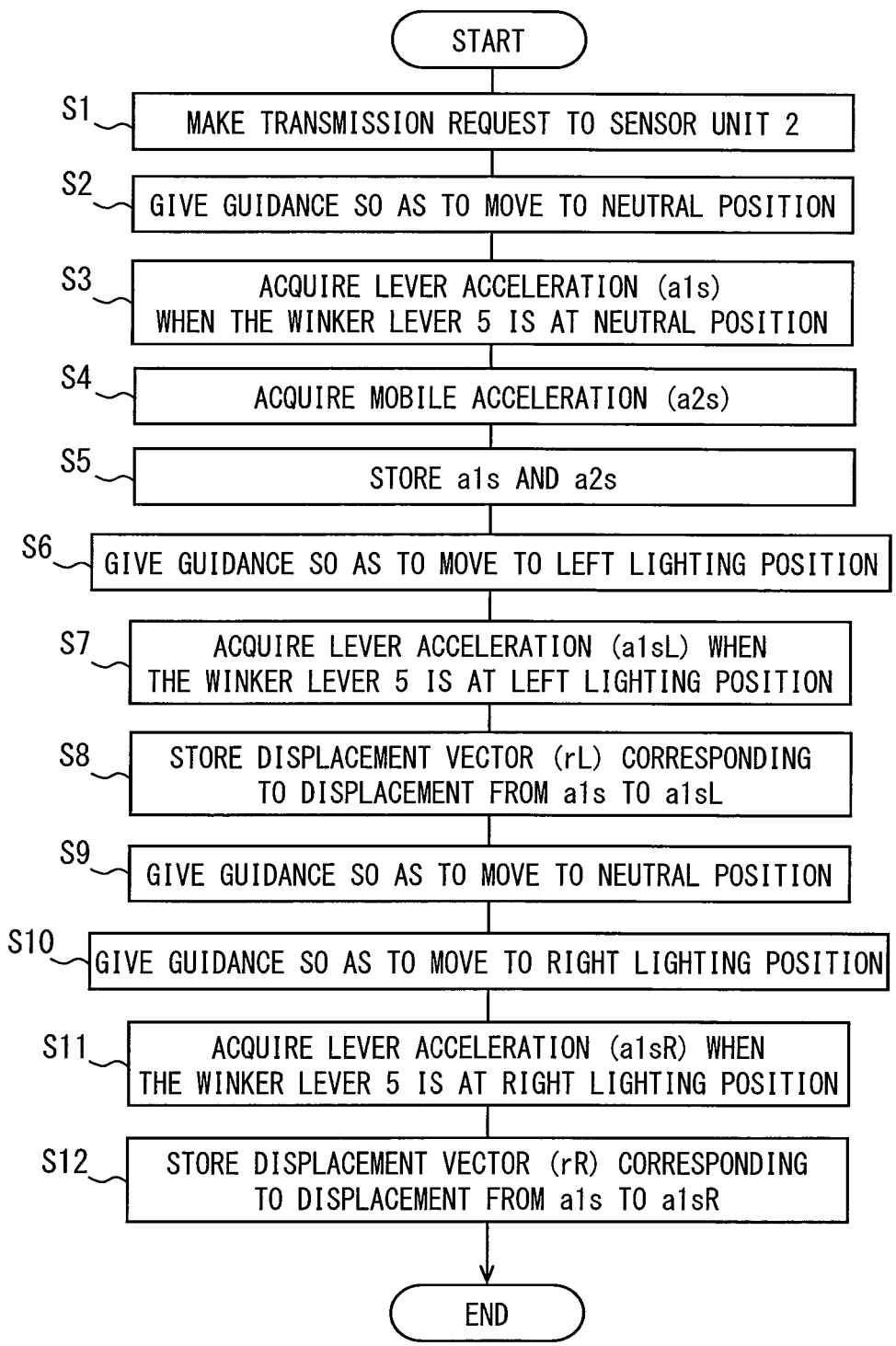
FIG. 5 is a flow chart to show an example of a flow of learning processing in learning processing part 336 in the first embodiment.

It is recommended that a flow chart shown in FIG. 5 is so constructed as to start in the case where an operation input part (not shown in the drawing) of the mobile terminal 3 receives a user operation to the effect that the abovementioned initial setting is started.

First, in S1, the transmission request part 333 is made to make a transmission request, thereby making it possible to receive a lever acceleration sensed by the sensor unit 2.

In S2, a voice output device or a display device (not shown in the drawing) is made to give a user a guidance so as to move the winker lever 5 within a specified period of, for example, 5 seconds or less. In the case where the winker lever 5 is not at the neutral position, the user receives the guidance and matches the winker lever 5 to the neutral position.

In S3, of the lever accelerations received by the lever acceleration reception part 334, the lever acceleration sensed by the lever acceleration sensor 21 of the sensor unit 2 after a specified period passes from the guidance in S2 is acquired. In other words, the lever acceleration when the winker lever 5 is at the neutral position is acquired. It is recommended to determine by the use of the time stamp whether or not a lever acceleration is sensed after the specified period passes from the guidance in S2.

In S4, a mobile acceleration acquired by the mobile acceleration acquisition part 335 is acquired. In S4, a mobile acceleration linked with a time stamp closest to a time stamp of the lever acceleration acquired in S3 is acquired.

In S5, the lever acceleration when the winker lever 5 is at the neutral position and the mobile acceleration acquired in S4 are stored in the learning result accumulation part 337. Hereinafter, the lever acceleration (a1s in FIG. 6 and FIG. 7) when the winker lever 5 is at the neutral position, which is acquired in S3, is referred to as a lever base acceleration (a1s), and the mobile acceleration (a2s in FIG. 6 and FIG. 7) acquired in s4 is referred to as a mobile base acceleration (a2s). Both of the lever acceleration and the mobile acceleration are acceleration vectors as described above, so the lever base acceleration (a1s) corresponds to an operation base acceleration vector and the mobile base acceleration (a2s) corresponds to a fixture base acceleration vector.

Figure 6:
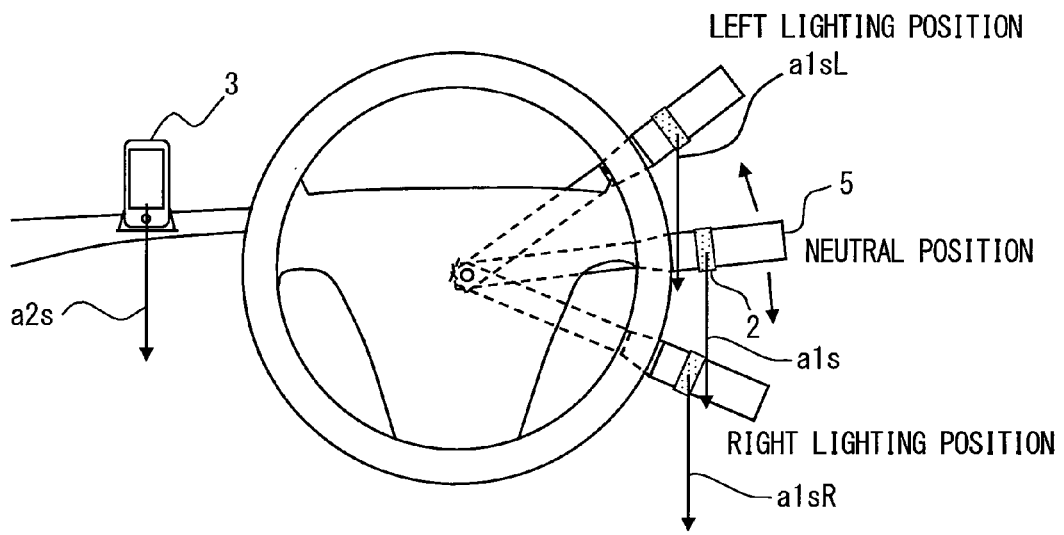
FIG. 6 is a schematic illustration to show a mobile base acceleration (a2s) sensed by a mobile acceleration sensor 32 while own vehicle is parked and position related lever accelerations (a1s, a1sL, a1sR) of a winker lever 5 sensed by a lever acceleration sensor 21 while own vehicle is parked.

FIG. 6 is a schematic illustration to show a mobile base acceleration (a2s), which is sensed by the mobile acceleration sensor 32 of the mobile terminal 3 while the own vehicle is parked, and lever accelerations (a1s, a1sL, a1sR) of respective positions of the winker lever 5, which are sensed by the lever acceleration sensor 21 of the sensor unit 2 while the own vehicle is parked. The lever accelerations of the respective positions of the winker lever 5 include the abovementioned lever base acceleration (a1s) when the winker lever is at the neutral position, a lever acceleration (a1sL) when the winker lever 5 is at the left lighting position, and a lever acceleration (a1sR) when the winker lever 5 is at the right lighting position. In the example shown in FIG. 6, the own vehicle is parked, so that all of the mobile base acceleration (a2s), the lever base accelerations (a1s), the lever acceleration (a1sL), and the lever acceleration (a1sR) are the gravitational accelerations.

Figure 7:
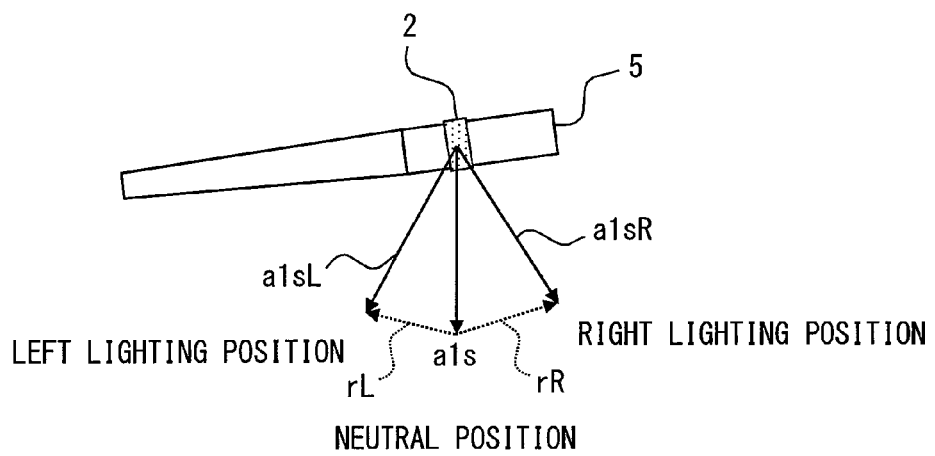
FIG. 7 is a schematic illustration to show a relationship among a vector of a lever base acceleration (a1s), a vector of a lever acceleration (a1sL), and a vector of a lever acceleration (a1sR) in a case where the winker levers 5 at respective positions in FIG. 6 are displayed in superposition.

Further, FIG. 7 is a schematic illustration to show the relationship among the vectors of the lever base accelerations (a1s), the lever acceleration (a1sL), and the lever acceleration (a1sR) in the case where the winker levers 5 of the respective positions in FIG. 6 are shown in such a way as to overlap each other. At all positions of the neutral position, the left lighting position, and the right lighting position, the gravitational acceleration is generated vertically downward in the sensor unit 2. However, the angle of the winker 5 is different from each other at the neutral position, the left lighting position, and the right lighting position. That is, the angle of the sensor unit 2 with respect to a vertical downward direction is different at the neutral position, the left lighting position, and the right lighting position. Hence, the vectors of the lever base acceleration (a1s), the lever acceleration (a1sL), and the lever acceleration (a1sR) are different from each other in direction.

In S6, the voice output device or the display device (not shown in the drawing) gives guidance to a user so as to displace the winker lever 5 to the left lighting position within the specified period. When the user receives the guidance, the user matches the winker lever 5 to the left lighting position from the neutral position.

In S7, as in the case of S3, of the lever accelerations received by the lever acceleration reception part 334, the lever acceleration sensed by the lever acceleration sensor 21 of the sensor unit 2 after a specified period passes from the guidance in S6 is acquired. In other words, the lever acceleration when the winker lever 5 is at the left lighting position (a1sL in FIG. 6 and FIG. 7) is acquired.

In S8, a displacement vector (rL in FIG. 7) corresponding to a displacement from the lever base acceleration (a1s) of the lever acceleration when the winker lever 5 is at the neutral position to the lever acceleration (a1sL) when the winker lever 5 is at the left lighting position is stored in the learning result accumulation part 337. Hereinafter, this displacement vector is referred to as a left lighting position displacement vector (rL).

In S9, the voice output device or the display device (not shown in the drawing) gives guidance to the user so as to the winker lever 5 to the neutral position within the specified period. When the user receives the guidance, the user matches the winker lever 5 to the neutral position.

In S10, after a specified period passes from the guidance in S9, the voice output device or the display device (not shown in the drawing) gives guidance to the user so as to the winker lever 5 to the right lighting position within the specified period. When the user receives the guidance, the user matches the winker lever 5 to the right lighting position from the neutral position.

In S11, as in the case of S3, of the lever accelerations received by the lever acceleration reception part 334, the lever acceleration sensed by the lever acceleration sensor 21 of the sensor unit 2 after a specified period passes from the guidance in S10 is acquired. In other words, the lever acceleration when the winker lever 5 is at the left lighting position (a1sR in FIG. 6 and FIG. 7) is acquired.

In S12, a displacement vector (rR in FIG. 7) corresponding to a displacement from the lever base acceleration (a1s) of the lever acceleration when the winker lever 5 is at the neutral position to the lever acceleration (a1sR) when the winker lever 5 is at the right lighting position is stored in the learning result accumulation part 337. Then, the learning processing is finished. Hereinafter, this displacement vector is referred to as a right lighting position displacement vector (rR).

<Reason why the Position of the Winker Lever 5 can be Sensed>

Here, by the use of FIG. 8 to FIG. 13, there will be described the reason why the position of the winker lever 5 can be sensed by the use of the lever acceleration, which is sensed by the lever acceleration sensor 21 of the sensor unit 2, and the mobile acceleration, which is sensed by the mobile acceleration sensor 32 of the mobile terminal 3. Here, the description will be made on the basis of the inclination of the own vehicle, a running state, and the position of the winker lever 5 (that is, the neutral position) when the learning processing is performed. Further, hereinafter, a lever acceleration sensed by the lever acceleration sensor 21 after the learning processing is referred to as a lever real acceleration, and a mobile acceleration sensed by the mobile acceleration sensor 32 after the learning processing is referred to as a mobile real acceleration.

FIGS. 8 to 13 illustrate examples of a lever acceleration and examples of a mobile acceleration in the case where conditions are variously changed from the conditions when the learning processing is performed. In FIG. 8 to FIG. 13, it is assumed that the mobile terminal 3 is always fixed to the own vehicle and that three sensing axes of the lever acceleration sensor 21 of the sensor unit 2 fixed to the winker lever 5 and three sensing axes of the mobile acceleration sensor 32 of the mobile terminal 3 do not match with each other.

Figure 8:
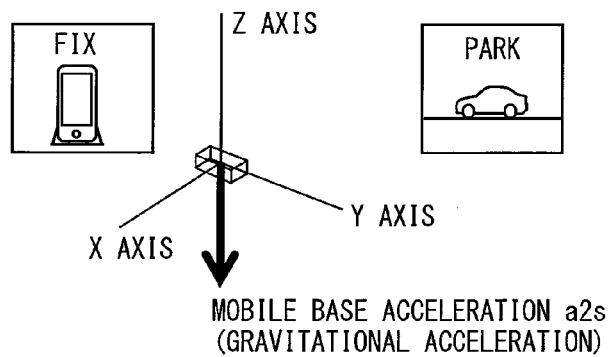
FIG. 8 is a schematic illustration to show a reason why the position of a winker lever 5 can be sensed from a lever acceleration sensed by a lever acceleration sensor 21 and from a mobile acceleration sensed by a mobile acceleration sensor 32.
Figure 8:
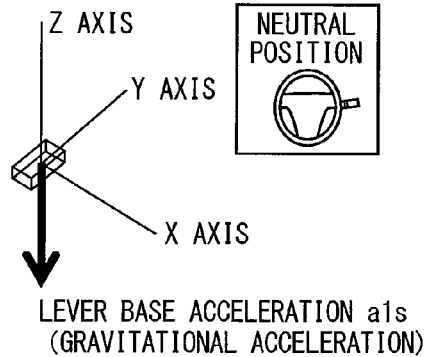
Figure 8:
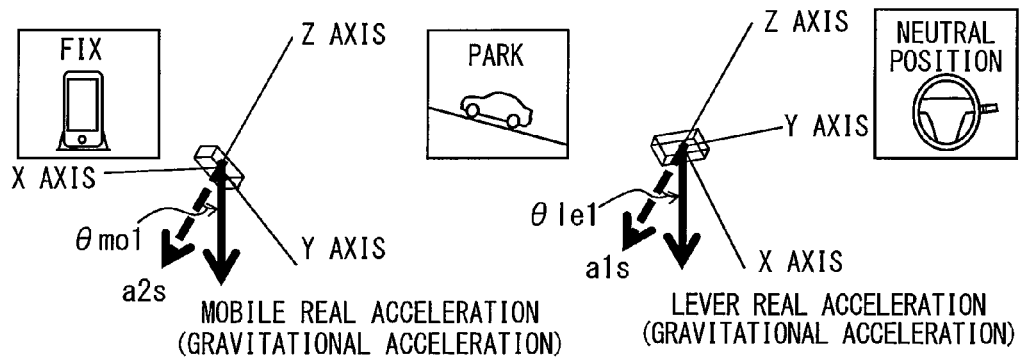

In FIG. 8, in the case where the inclination of the own vehicle is changed from the conditions when the learning processing is performed, a displacement of a mobile real acceleration (see a solid arrow in the drawing) sensed by the mobile acceleration sensor 32 and a displacement of a lever real acceleration (see a solid arrow in the drawing) sensed by the lever acceleration sensor 21 will be schematically shown. In the upper part of FIG. 8 are shown the conditions when the learning processing is performed, whereas in the lower part of FIG. 8 are shown the conditions after the inclination of the own vehicle being changed. As shown in FIG. 8, when the conditions when the learning processing is performed are compared with the conditions when the inclination of the own vehicle is changed, the position of the mobile terminal 3 is held fixed and the position of the winker lever 5 is held at the neutral position and only the inclination of the own vehicle is different as a condition.

In the case where the own vehicle is parked, an acceleration other than the gravitational acceleration is not generated in the mobile terminal 3 and in the sensor unit 2. Hence, as shown in FIG. 8, the lever real acceleration becomes an acceleration in which an angle (θle1 in FIG. 8) is displaced from the lever base acceleration (a1s) by the inclination of the own vehicle, and the mobile real acceleration becomes an acceleration in which an angle (θmol in FIG. 8) is displaced from the mobile base acceleration (a2s) by the inclination of the own vehicle. Here, "le" in the θle1 is an abbreviation of "lever" and "mol" in the θmol is an abbreviation of "mobile". Similarly, "le" and "mo", which will be used later, are abbreviations of "lever" and "mobile", respectively.

In an example shown in FIG. 8, like the conditions when the learning processing is performed, the winker lever 5 is at the neutral position, that is, the position of the winker lever 5 is not changed. The own vehicle is parked and neither the mobile terminal 3 nor the sensor unit 2 is changed in their positions with respect to the own vehicle. Hence, the real displacement angle (θle1) of the lever real acceleration from the lever base acceleration (a1s), which is caused by the inclination of the own vehicle, is supposed to be equal to the real displacement angle (θmol) of the mobile real acceleration from the mobile base acceleration (a2s) which is caused by the inclination of the own vehicle.

Figure 9:
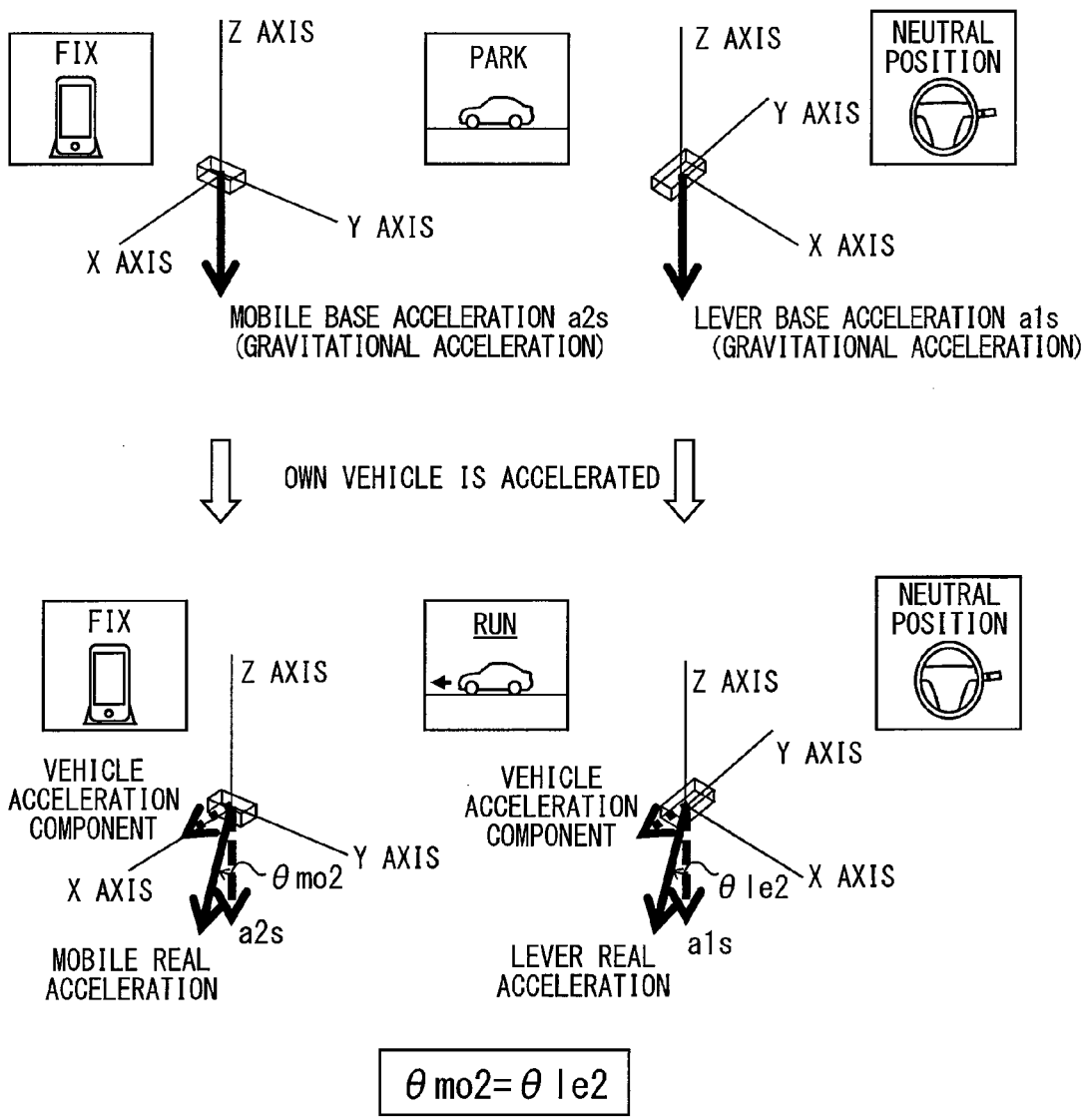
FIG. 9 is a schematic illustration to show a reason why the position of a winker lever 5 can be sensed from a lever acceleration sensed by a lever acceleration sensor 21 and from a mobile acceleration sensed by a mobile acceleration sensor 32.

Further, as shown in FIG. 9, in the case where the own vehicle is running, that is, in the case where the conditions are different only in the running state of the own vehicle from the conditions when the learning processing is performed, in addition to the gravitational acceleration, an acceleration generated by the running of the own vehicle is generated in both of the mobile terminal 3 and the sensor unit 2. Hence, as shown in FIG. 9, there can be acquired a lever real acceleration in which an angle (θle2 in FIG. 9) is displaced from the lever base acceleration (a1s) by an acceleration generated by the running of the own vehicle and a mobile real acceleration in which an angle (θmo2 in FIG. 9) is displaced from the mobile base acceleration (a2s) by an acceleration generated by the running of the own vehicle.

In an example shown in FIG. 9, like the conditions when the learning processing is performed, the winker lever 5 is at the neutral position, that is, the position of the winker lever 5 is not changed. Further, the inclination of the own vehicle is the same as when the learning processing is performed. Hence, the real displacement angle (θle2) of the lever real acceleration from the lever base acceleration (a1s), which is caused by the running of the own vehicle, is supposed to be equal to the real displacement (θmo2) of the mobile real acceleration from the mobile base acceleration (a2s), which is caused by the running of the own vehicle.

From the above, in the case where the real displacement angle (which is assumed to be θle) of the lever real acceleration from the lever base acceleration (a1s) is approximate to the real displacement angle (which is assumed to be θmo) of the mobile real acceleration from the mobile base acceleration (a2s), which is generated by the running of the own vehicle, it can be said that the winker lever 5 is at the neutral position.

Figure 10:
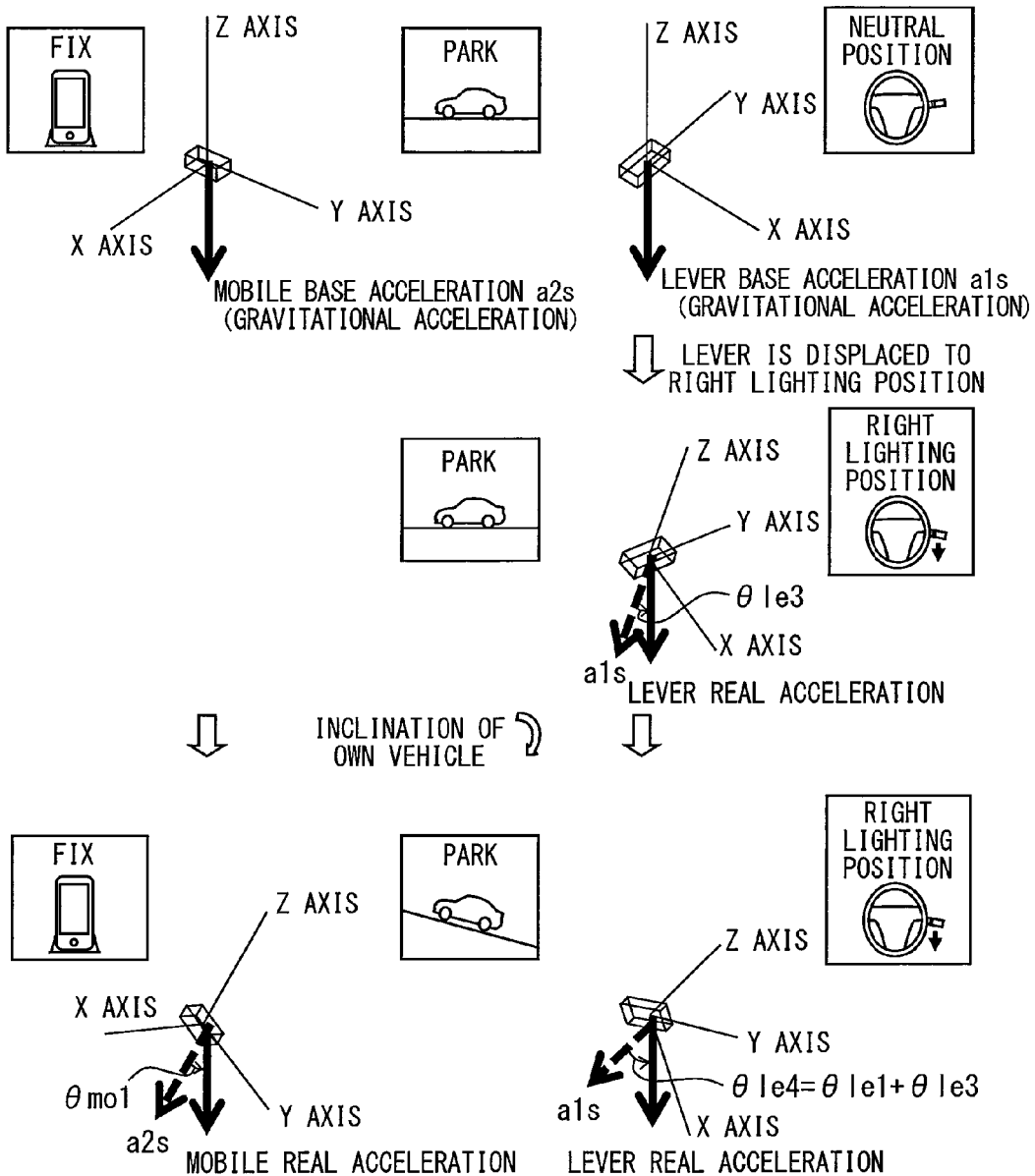
FIG. 10 is a schematic illustration to show a reason why the position of a winker lever 5 can be sensed from a lever acceleration sensed by a lever acceleration sensor 21 and from a mobile acceleration sensed by a mobile acceleration sensor 32.
Figure 11:
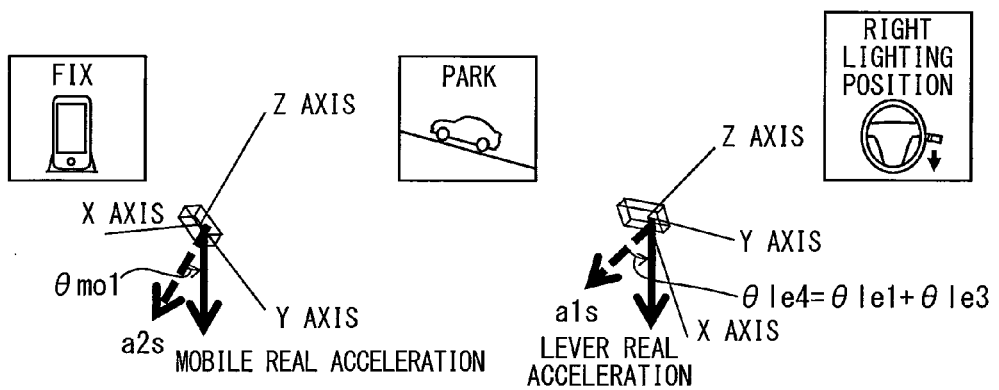
FIG. 11 is a schematic illustration to show a reason why the position of a winker lever 5 can be sensed from a lever acceleration sensed by a lever acceleration sensor 21 and from a mobile acceleration sensed by a mobile acceleration sensor 32.
Figure 11:
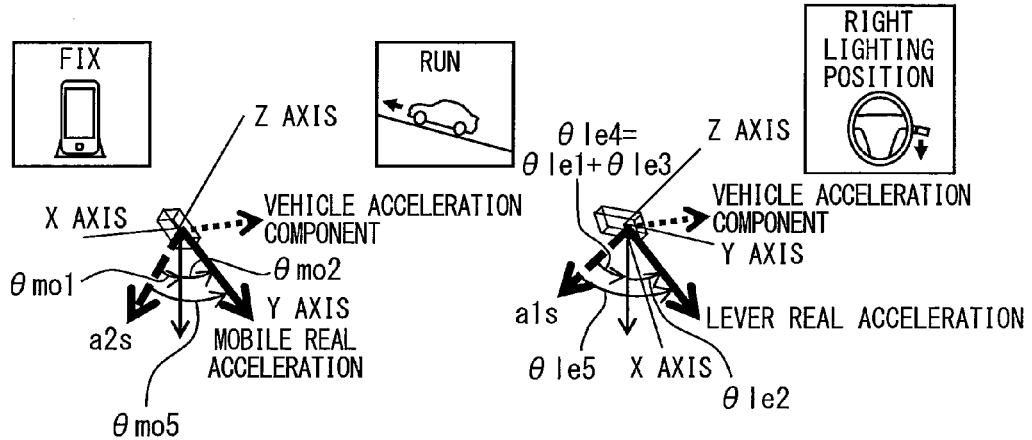

Subsequently, there will be described the case where the position of the winker lever 5 is displaced to the right lighting position. As shown in FIG. 10, from the same conditions as conditions when the learning processing is performed, in the case where the position of the winker lever 5 is displaced from the neutral position to the right lighting position, the lever real acceleration becomes an acceleration in which an angle (θle3 in FIG. 10) is displaced from the lever base acceleration (a1s) by a change in the position of the winker lever 5.

Here, in the case where the inclination of the own vehicle is caused as in the case of FIG. 8, the mobile real acceleration sensed by the mobile acceleration sensor 32 becomes an acceleration in which an angle (θmo1 in FIG. 10) is displaced from the mobile base acceleration (a2s) by the inclination of the own vehicle.

Further, the lever real acceleration sensed by the lever acceleration sensor 21 becomes an acceleration in which an angle (θle4 in FIG. 10) is displaced from the lever base acceleration (a1s) by the sum of a displacement (that is, θle3), which is caused by a change of the position of the winker lever 5 to the right lighting position, and the displacement (θle1 described above) of the inclination of the own vehicle.

In addition to this, in the case where the acceleration of the own vehicle is generated as in the case of FIG. 9, the mobile real acceleration sensed by the mobile acceleration sensor 32 becomes an acceleration in which an angle (θmo2 in FIG. 11) is further displaced by the acceleration generated by the running of the own vehicle. In other words, there can be acquired a mobile real acceleration in which an angle is displaced from the mobile base acceleration (a2s) by the displacement (θmol) of the inclination of the own vehicle and the displacement (θmo2) of the acceleration generated by the running of the own vehicle.

On the other hand, the lever real acceleration sensed by the lever acceleration sensor 21 becomes an acceleration in which an angle (θle2 in FIG. 11) is further displaced by the acceleration generated by the running of the oven vehicle. In short, there can be acquired a lever real acceleration caused by the displacement (θle3 in FIG. 10) from the right lighting position of the winker lever 5, the displacement (θle1) caused by the inclination of the own vehicle, and the displacement (θle2) of the acceleration generated by the running of the own vehicle, from the lever base acceleration (a1s).

As described above, θmol is equal to θle1 and θmol2 is equal to θle2, so only a difference due to the displacement (θle3), which is caused by the winker lever 5 being displaced to the right lighting position, is between the mobile acceleration sensor 32 and the acceleration sensed by the lever acceleration sensor 21. Hence, whether or not the winker lever 5 is at the right lighting position can be sensed depending on the presence of this difference.

However, even if a difference between a displacement angle (θmol5 in FIG. 11) from the mobile base acceleration (a2s) to the mobile real acceleration and a displacement angle (θle5 in FIG. 11) from the lever base acceleration (a1s) to the lever real acceleration is simply found, a displacement angle (θle3) caused by the winker lever 5 is not necessarily displaced to the right lighting position. This is because of the following reason: that is, a direction of the acceleration caused by the running of the own vehicle is not on a turning plane of the inclination of the own vehicle, and the sensing axes of the mobile acceleration sensor 32 and the sensing axes of the lever acceleration sensor are different from each other, so θmo1 and θmo2, θle4 and θle2 cannot be expressed on the same plane, which hence results in (θmo1+θmo2≠θmo5) and (θle4+θle2≠θle5).

Figure 12:
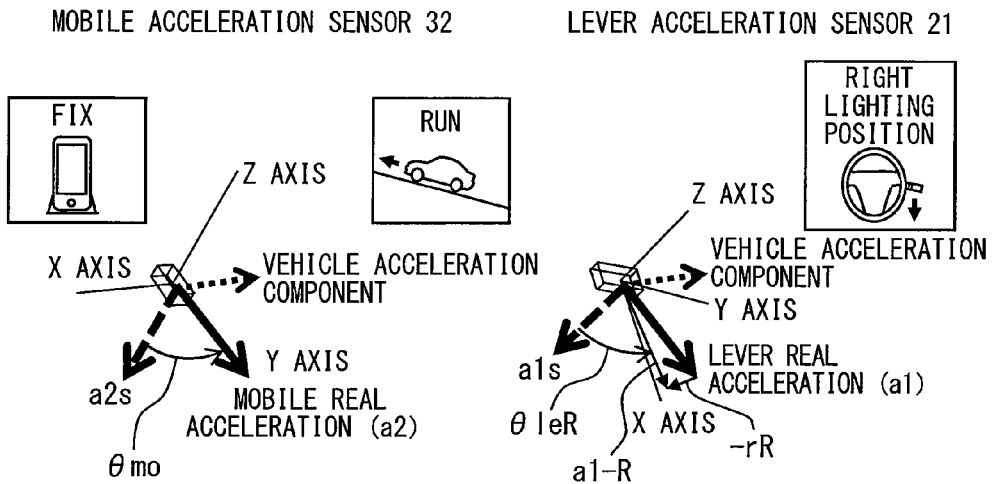
FIG. 12 is a schematic illustration to show a reason why the position of a winker lever 5 can be sensed from a lever acceleration sensed by a lever acceleration sensor 21 and from a mobile acceleration sensed by a mobile acceleration sensor 32.

Hence, whether or not the winker lever 5 is at the right lighting position is sensed in the following manner. As shown in FIG. 12, a right lighting position displacement vector (rR) in the case where the winker lever 5 is displaced from the neutral position to the right lighting position is returned from a lever real acceleration vector (hereinafter referred to as "a1") that is an observation value. An acceleration vector (hereinafter referred to as "a1-R") acquired by returning the right lighting position displacement vector (rR) from the lever real acceleration vector (a1) becomes an acceleration vector acquired by removing an acceleration component vector corresponding to a displacement from the neutral position to the right lighting position of the winker lever 5 if the winker lever 5 is at the right lighting position. Hence, an assumed displacement angle (hereinafter referred to as "θ1eR") from the lever base acceleration vector (a1s) of the acceleration vector (a1-R), which is acquired by returning the right lighting position vector (rR) from the lever real acceleration vector (a1), is supposed to be equal to a real displacement angle (θmo) from the mobile base acceleration vector (a2s) to the mobile real acceleration vector.

Hence, in the case where the assumed displacement angle (hereinafter referred to as "θ1eR") from the lever base acceleration vector (a1s) of the acceleration vector (a1-R), which is acquired by returning the right lighting position displacement vector (rR) from the lever real acceleration vector (a1), is approximate to the real displacement angle (that is, θmo) from the mobile base acceleration vector (a2s) to the mobile real acceleration vector, it can be said that the winker lever 5 is at the right lighting position. Hereinafter, the assumed displacement angle (θ1eR) is referred to as a right lighting position assumed displacement angle (θ1eR).

Figure 13:
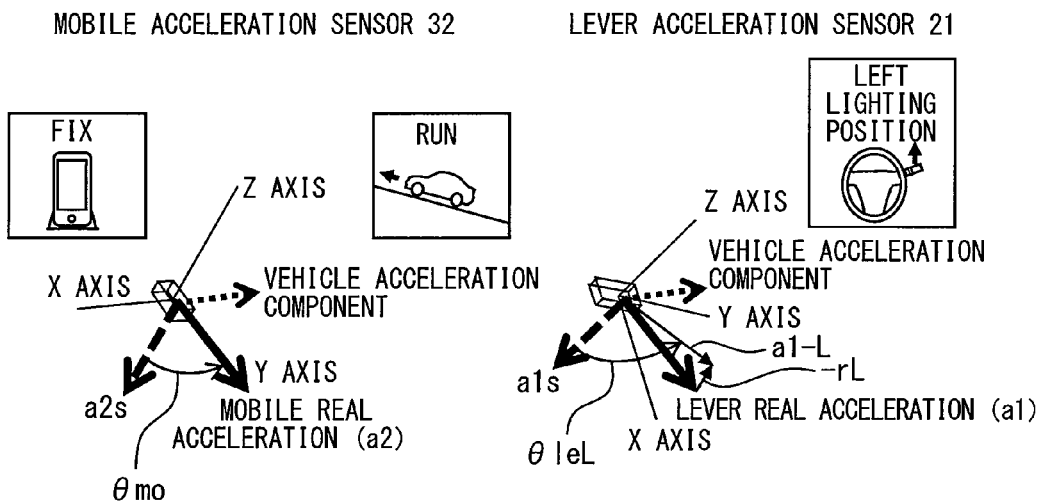
FIG. 13 is a schematic illustration to show a reason why the position of a winker lever 5 can be sensed from a lever acceleration sensed by a lever acceleration sensor 21 and from a mobile acceleration sensed by a mobile acceleration sensor 32.

This is ditto for sensing whether or not the winker lever 5 is at the left lighting position. As shown in FIG. 13, in the case where an assumed displacement angle (hereinafter referred to as "θ1eL") from the lever base acceleration vector (a1s) of an acceleration vector (hereinafter referred to as "a1-L"), which is acquired by returning a left lighting position displacement vector (rL) from the lever real acceleration vector (a1), is approximate to the real displacement angle (θmo) from the mobile base acceleration vector (a2s) to the mobile real acceleration vector, it can be said that the winker lever 5 is at the left lighting position. Hereinafter, the assumed displacement angle (θ1eL) is referred to as a left lighting position assumed displacement angle (θ1eL).

Further, as described above, in the case where the real displacement angle (θle) from the lever base acceleration (a1s) to the lever real acceleration is approximate to the real displacement angle (θmo) from the mobile base acceleration (a2s) to the mobile real acceleration, it can be said that the winker lever 5 is at the neutral position.

<Operation Position Sensing Relating Processing in Embodiment 1>

Figure 14:
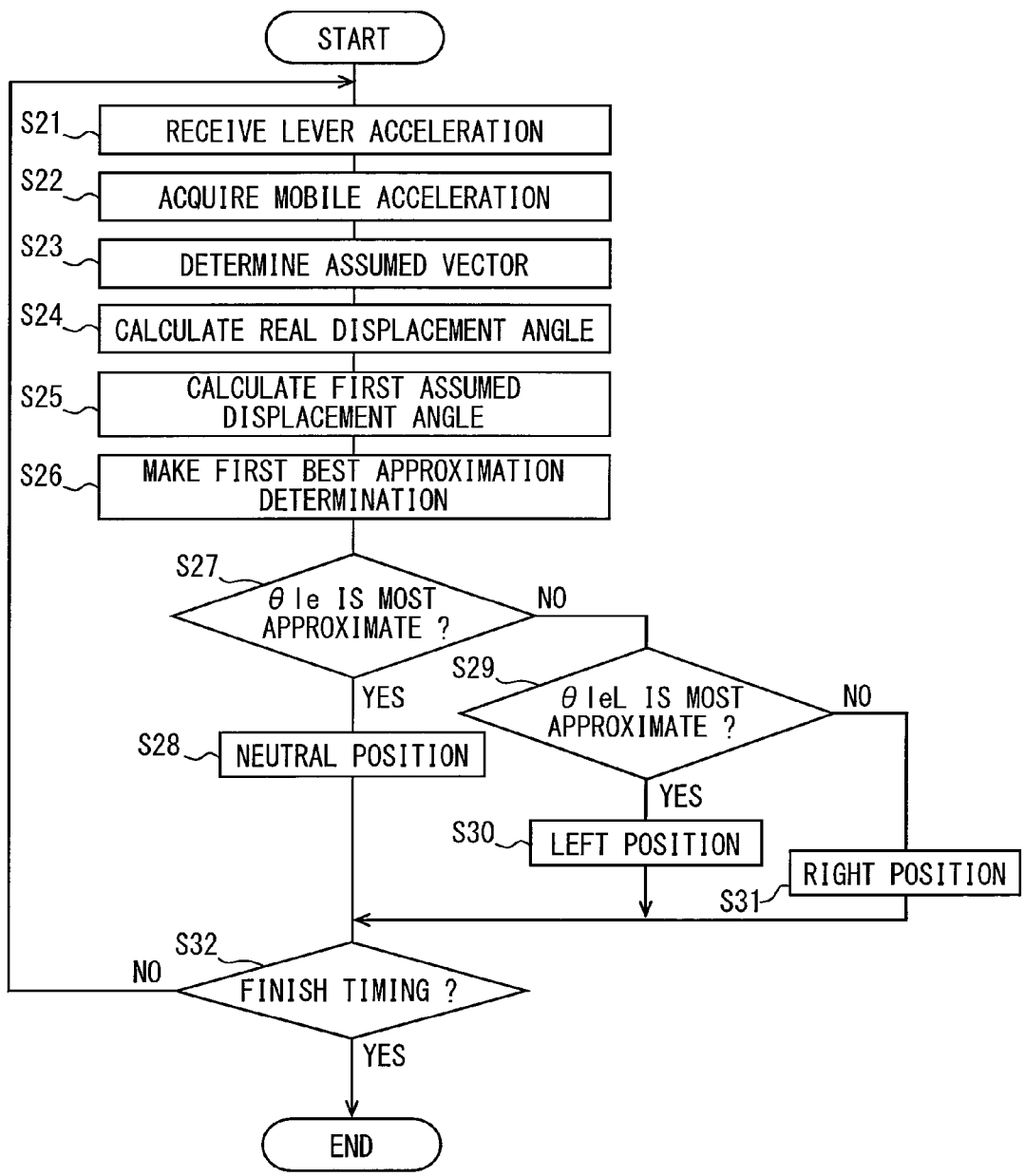
FIG. 14 is a flow chart to show an example of a flow of operation position relating processing performed by a mobile control part 33 in the first embodiment.

Subsequently, by the use of a flow chart shown in FIG. 14, processing relating to the sensing of the position of the winker lever 5 by the mobile control part 33 of the mobile terminal 3 in the first embodiment (hereinafter referred to as "operation position sensing relating processing") will be described. In the operation position sensing relating processing, the position of the winker lever 5 is sensed by the use of the method of sensing the position of the winker lever 5, which has been described above. The flow chart shown in FIG. 14 may be so constructed as to start in the case where the learning processing is already performed and where the transmission request is made from the transmission request part 333.

As an example in which the transmission request is made from the transmission request part 333 after the abovementioned learning processing is performed, a case can be mentioned where the timing determination part 338 determines the timing when the position of the winker lever 5 needs to be sensed. For example, in the case where the position of the winker lever 5 needs to be sensed for the assistance of the operation, the timing determination part 338 determines that a state where the assistance of the operation is to be prepared is brought about is the timing when the position of the winker lever 5 needs to be sensed.

The state where the assistance of the operation is to be prepared includes a case where another vehicle is near the own vehicle and a case where the own vehicle is near an intersection. Further, the timing determination part 338 may be so constructed as to determine also the timing when the position of the winker lever 5 does not need to be sensed and to make a stop request of stopping the transmission of the lever acceleration from the sensor unit 2.

First, in S21, the lever acceleration reception part 334 performs the abovementioned lever acceleration reception processing and receives the lever acceleration transmitted from the sensor unit 2 (that is, the lever real acceleration) and then the routine proceeds to S22. In S22, the mobile acceleration acquisition part 335 performs the abovementioned mobile acceleration acquisition processing and acquires the mobile acceleration sensed by the mobile acceleration sensor 32 of the terminal itself and then the routine proceeds to S23.

In S23, an assumed vector determination part 339 performs assumed vector determination processing from the lever real acceleration received by the lever acceleration reception processing and the left lighting position displacement vector (rL) and the right lighting position displacement vector (rR) which are stored in the learning result accumulation part 337.

In the assumed vector determination processing, a left position displaced vector (a1-L), which is obtained by displacing the lever real acceleration by an opposite direction component (-rL) of the left lighting position displacement vector (rL) is determined (see FIG. 13). Further, in this assumed vector determination processing, also a right position displaced vector (a1-R) obtained by displacing the lever real acceleration by an opposite direction component (-rR) of the right lighting position displacement vector (rR) is determined (see FIG. 12).

In S24, a real displacement angle calculation part 340 performs real displacement angle calculation processing of calculating a real displacement angle (θle) formed by the lever base acceleration (a1s), which is stored in the learning result accumulation part 337, and the lever real acceleration which is received by the lever acceleration reception processing. Here, the real displacement angle (θle) is an absolute value having no plus and minus signs.

Further, in the real displacement angle calculation processing in S24, a real displacement angle (θmo) formed by the mobile base acceleration (a2s), which is stored in the learning result accumulation part 337, and the mobile real acceleration which is received by the mobile acceleration reception processing is calculated. Here, the real displacement angle (θmo) is an absolute value having no plus and minus signs.

In S25, the first assumed displacement angle calculation part 341 performs first assumed displacement angle calculation processing of calculating a left position assumed displacement angle ($\theta$leL) formed by the lever base acceleration (a1s) and the left position displaced vector (a1-L) determined by the assumed vector determination processing (see FIG. 13). Further, in the first assumed displacement angle calculation processing, a right position assumed displacement angle ($\theta$leR) formed by the lever base acceleration and the right position displaced vector (a1-R) determined by the assumed vector determination processing is calculated. Here, the left position assumed displacement angle ($\theta$leL) and the right position assumed displacement angle ($\theta$leR) are, for example, absolute values having no plus and minus signs. The left position displaced vector (a1-L) and the right position displaced vector (a1-R) correspond to assumed vectors. Further, the left position assumed displacement angle ($\theta$leL) and the right position assumed displacement angle ($\theta$leR) correspond to assumed displacement angles calculated by the first assumed displacement angle calculation part.

In S26, the first best approximation determination part 342 performs a first best approximation determination processing for determining the most approximate value to the real displacement angle ($\theta$mo) calculated by the real displacement angle calculation processing among the real displacement angle ($\theta$le) calculated by the real displacement angle calculation processing, the left position assumed displacement angle ($\theta$leL) and the right position assumed displacement angle ($\theta$leR) which are calculated by the first assumed displacement angle calculation processing.

In S27, in the case where as the result of the first best approximation determination processing, the real displacement angle ($\theta$le) is the most approximate to the real displacement angle ($\theta$mo) (YES in S27), the routine proceeds to S28. On the other hand, in the case where the real displacement angle ($\theta$le) is not the most approximate to the real displacement angle ($\theta$mo) (NO in S27), the routine proceeds to S29. In S28, the operation position sensing part 343 senses that the position of the winker lever 5 is the neutral position. The real displacement angle ($\theta$le) corresponds to an operation displacement angle and the real displacement angle ($\theta$le) corresponds to a fixture displacement angle.

In S29, as the result of the first best approximation determination processing, in the case where the left position assumed displacement angle ($\theta$leL) is the most approximate to the real displacement angle ($\theta$mo) (YES in S29), the routine proceeds to S30. On the other hand, in the case where the left position assumed displacement angle ($\theta$leL) is not the most approximate to the real displacement angle ($\theta$mo) (NO in S29), that is, in the case where the right position assumed displacement angle ($\theta$leR) is the most approximate to the real displacement angle ($\theta$mo), the routine proceeds to S31.

In S30, the operation position sensing part 343 detects that the position of the winker lever 5 is the left lighting position. In S31, the operation position sensing part 343 detects that the position of the winker lever 5 is the right lighting position.

The left lighting position displacement vector (rL) and the right lighting position displacement vector (rR) are stored in the learning result accumulation part 337 when the learning processing is performed and do not always match the behavior of the own vehicle when the operation position sensing relating processing is performed, which hence causes small errors from a real state. However, in the present embodiment, among the real displacement angle ($\theta$le), the left position assumed displacement angle ($\theta$leL), and the right position assumed displacement angle ($\theta$leR), the displacement angle which is the most approximate to the real displacement angle ($\theta$mo) is determined. Hence, the position of the winker lever 5 can be sensed with high accuracy with the effect of the errors eliminated.

In S32, in the case where this is the timing when the operation position sensing relating processing is finished (YES in S32), the processing shown in FIG. 4 is finished. On the other hand, in the case where this is not the timing when the operation position sensing relating processing is finished (NO in S32), the routine returns to S21 where the abovementioned processing is repeatedly performed. An example of the timing when the operation position sensing relating processing is finished is the timing when the mobile control part 33 makes the abovementioned stop request or the timing when the abovementioned application program is finished.

<Summary of the Embodiment 1>

Each of the lever acceleration sensor 21 and the mobile acceleration sensor 32 is a three-axis acceleration sensor for sensing an acceleration at least in a gravitational acceleration direction. Hence, while the own vehicle runs, an acceleration as a sensing result of each of the lever acceleration sensor 21 and the mobile acceleration sensor 32 includes not only the gravitational acceleration but also an acceleration component caused by the behavior of the own vehicle.

Hence, when the sensing result of the mobile acceleration sensor 32 of the mobile terminal 3, which is placed or fixed in the vehicle, is made an object to be compared, an acceleration component caused by the behavior of the own vehicle is eliminated and hence a difference in the acceleration caused by a difference in the position of the winker lever 5 can be determined. Therefore, the position of the winker lever 5 can be sensed with higher accuracy.

Further, in the construction of the first embodiment, the accelerations themselves sensed by the lever acceleration sensor 21 and the mobile acceleration sensor 32 are not made objects to be compared, but the displacement amounts from the base acceleration learned under specified conditions (that is, the real displacement angle ($\theta$mo), the real displacement angle ($\theta$le), the left position assumed displacement angle ($\theta$leL), the right position assumed displacement angle ($\theta$leR) are made objects to be compared. Hence, even if the axes of the lever acceleration sensor 21 and the mobile acceleration sensor 32 do not match, those displacement angles can be compared. Therefore, the first embodiment has an advantage of eliminating the need for matching the directions of the sensor unit 2 and the mobile terminal 3 for the purpose of matching the sensing axes of the lever acceleration sensor 21 to the sensing axes of the mobile terminal 3.

(Embodiment 2)

The present disclosure is not limited to the embodiment described above but also a following second embodiment is included in the technical scope of the present disclosure. Hereinafter, the second embodiment will be described. Here, for convenience of description, in the descriptions of the second embodiment and subsequent embodiments, parts having the same functions as the parts shown in the drawings used for the prior embodiments will be denoted by the same reference symbols and their descriptions will be omitted.

A vehicle operation sensing system 1 of the second embodiment is the same as the vehicle operation sensing system 1 of the first embodiment except for using the left lighting position displacement angle and the right lighting displacement angle, which will be described later, in place of the left lighting position displacement vector (rL) and the right lighting displacement vector (rR), which are described above.

Figure 15:
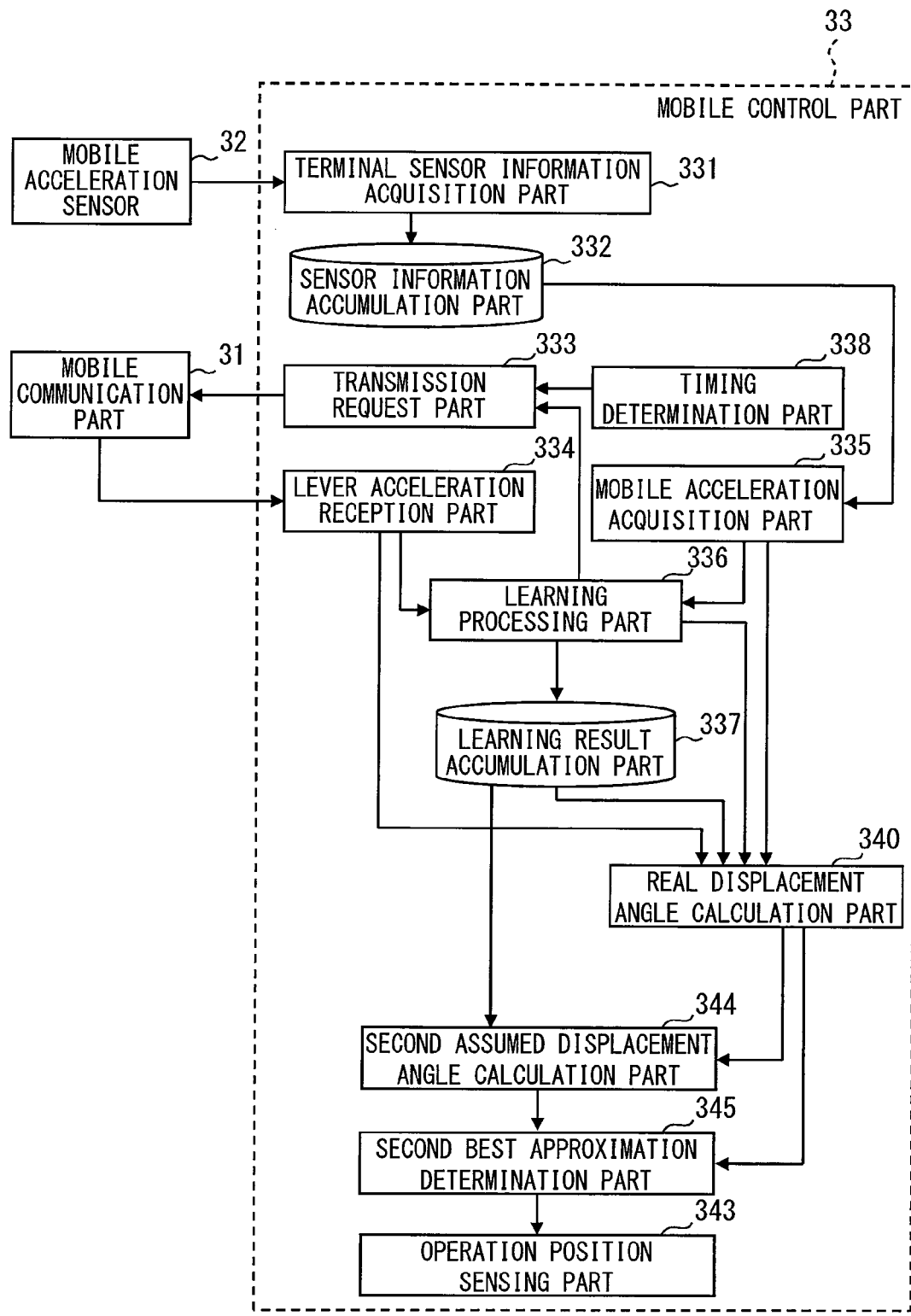
FIG. 15 is a function block diagram to show an example of a general construction of a mobile control part 33 in a second embodiment.

As shown in FIG. 15, a mobile control part 33 has a terminal sensor information acquisition part 331, a sensor information accumulation part 332, a transmission request part 333, a lever acceleration reception part 334, a mobile acceleration acquisition part 335, a learning processing part 336, a learning result accumulation part 337, a timing determination part 338, a real displacement angle calculation part 340, an operation position sensing part 343, a second assumed displacement angle calculation part 344, and a second best approximation determination part 345.

<Learning Processing in the Embodiment 2>

Figure 16:
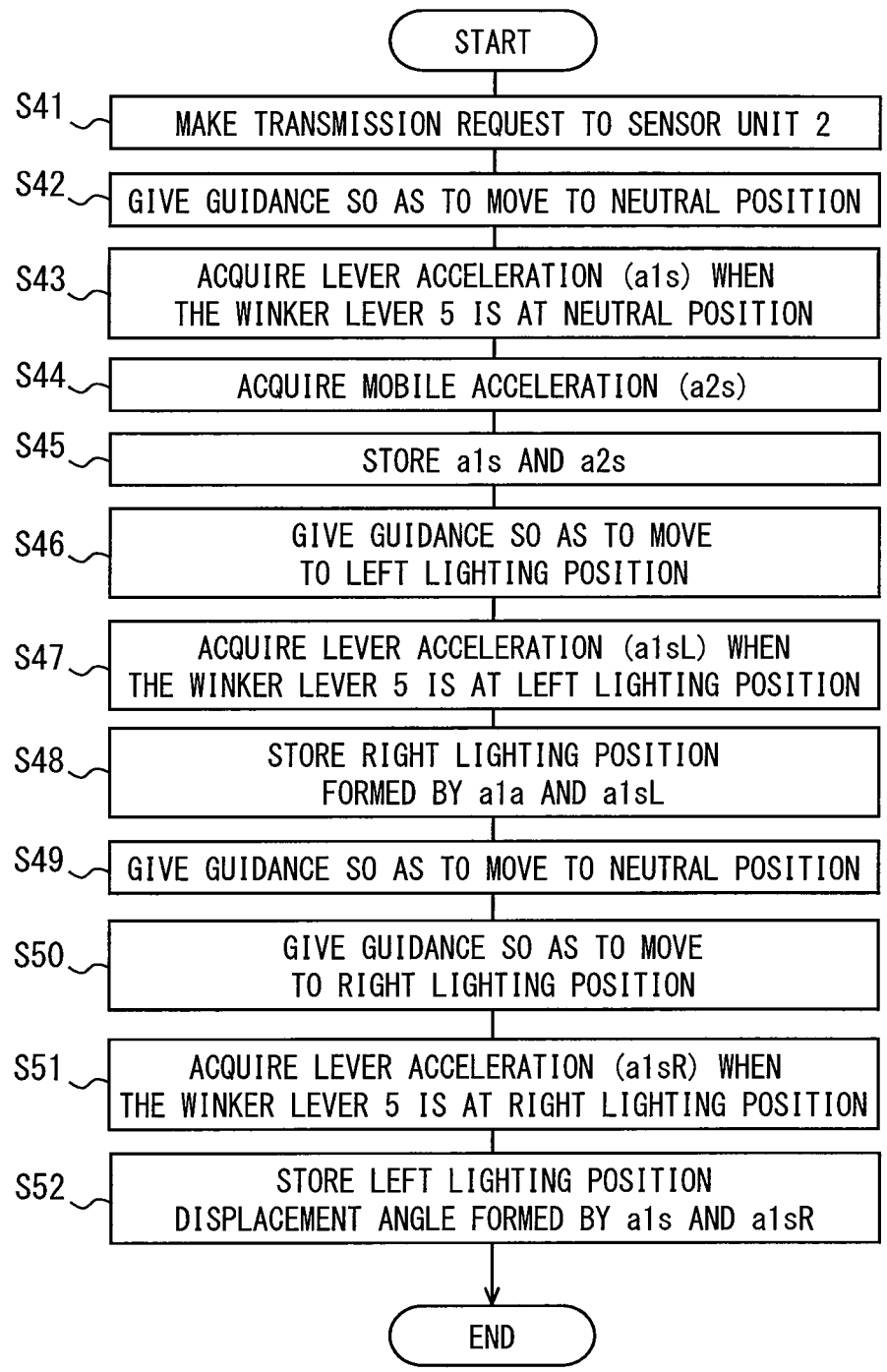
FIG. 16 is a flow chart to show an example of a flow of learning processing performed by a learning processing part 336 in the second embodiment.

In the learning processing part 336 of the second embodiment, following learning processing will be performed. Here, by the use of a flow chart shown in FIG. 16, the learning processing performed by the learning processing part 336 of the second embodiment will be described.

First, processing in S41 to S47 is the same as the processing in S1 to S7 described above. In S48, an angle (hereinafter referred to as "a left lighting position displacement angle") formed by the lever base acceleration (a1s) when the winker lever 5 is at the neutral position, which is acquired in S43, and a lever acceleration (a1sL) when the winker lever 5 is at the left lighting position is stored in the learning result accumulation part 337.

The processing in S49 and S51 is the same as the processing in S9 to S11 described above. In S52, an angle (hereinafter referred to as "a left lighting position displacement angle") formed by the lever base acceleration (a1s) when the winker lever 5 is at the neutral position, which is acquired in S43, and a lever acceleration (a1sL) when the winker lever 5 is at the right lighting position is stored in the learning result accumulation part 337. For example, in the case where the winker lever 5 is at a clockwise position with respect to the vector of the lever base acceleration (a1s), the angle described above is denoted by a minus sign, and in the case where the winker lever 5 is at an anticlockwise position with respect to the vector of the lever base acceleration (a1s), the angle described above is denoted by a plus sign.

<Operation Position Sensing Relating Processing>

Figure 17:
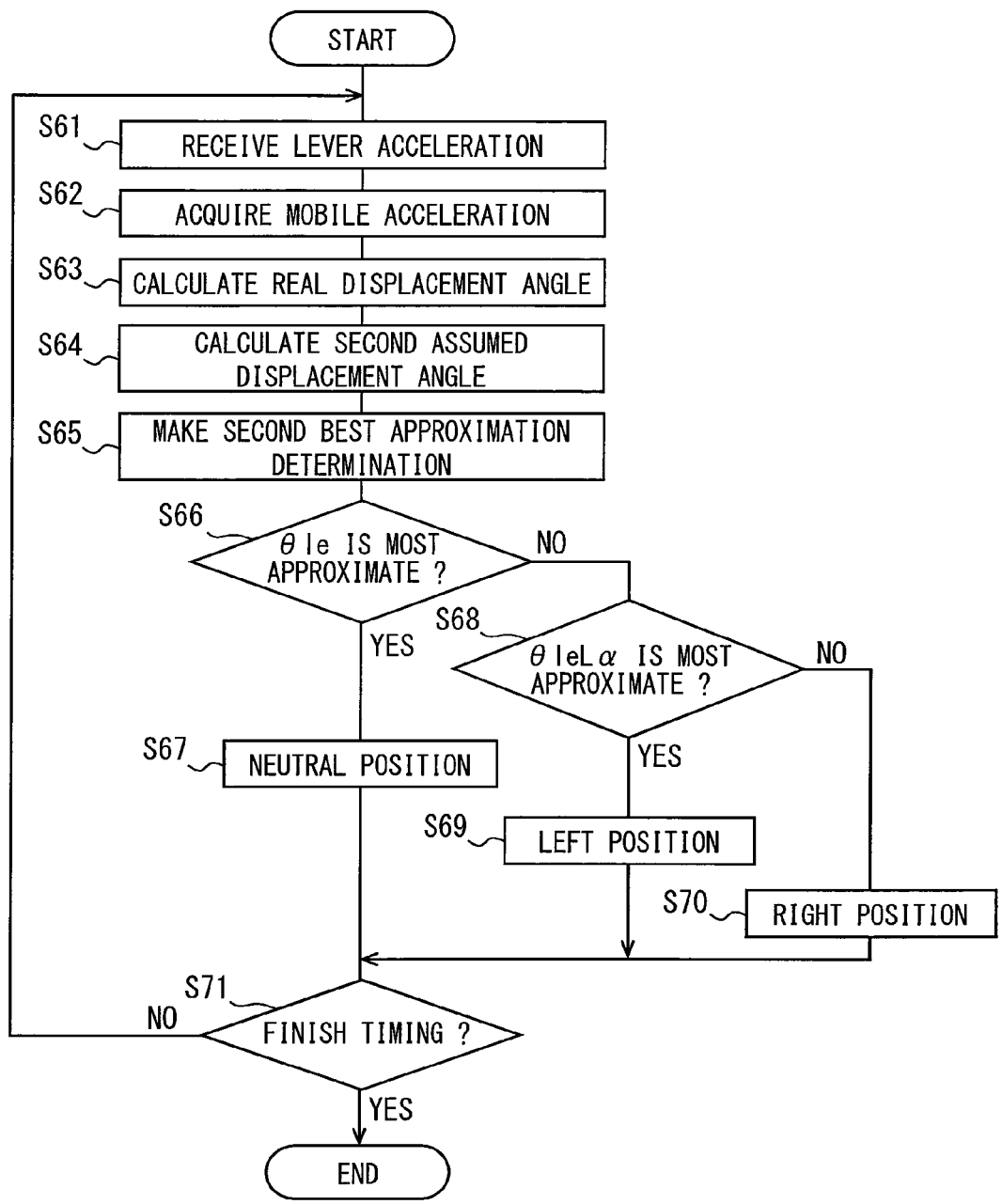
FIG. 17 is a flow chart to show an example of a flow of operation position relating processing performed by the mobile control part 33 in the second embodiment.

Subsequently, by the use of a flow chart shown in FIG. 17, operation sensing relating processing performed by the mobile control part 33 of the mobile terminal 3 in the second embodiment will be described. The flow chart shown in FIG. 17 is so constructed as to start in the case where the abovementioned learning processing is already performed and where a transmission request is made from the transmission request part 333.

In the operation sensing relating processing in the first embodiment, processing for displacing the lever real acceleration by a displacement vector (that is, rL or rR) in the case where the position of the winker lever 5 is the left lighting position or the right lighting position is performed. In contrast to this, the operation sensing relating processing in the second embodiment is different in that processing for subtracting a displacement angle in the case where the position of the winker lever 5 is the left lighting position or the right lighting position (that is, a left lighting position displacement angle or a right lighting position displacement angle) is subtracted from a real displacement angle (θle) of the lever real acceleration from the lever base acceleration (a1s). The left lighting position displacement angle and the right lighting position displacement angle corresponds to a position related displacement angle.

First, processing in S61 and S62 is the same as the processing in S21 and S22 of the first embodiment.

In S63, like S24 of the first embodiment, the real displacement angle calculation part 340 performs real displacement angle calculation processing for calculating a real displacement angle (θle) formed by the abovementioned lever base acceleration (a1s) stored in the learning result accumulation part 337 and a lever real acceleration received by the lever acceleration reception processing. However, in the second embodiment, for example, in the case where the winker lever 5 is at a clockwise position with respect to the lever base acceleration (a1s), the real displacement angle (θle) described above is denoted by a minus sign, and in the case where the winker lever 5 is at an anticlockwise position with respect to the lever base acceleration (a1s), the real displacement angle (θle) described above is denoted by a plus sign.

Here, in the present embodiment is shown a construction in which: in the case where the winker lever 5 is at a clockwise position with respect to the lever base acceleration (a1s), the real displacement angle (θle) described above is denoted by a minus sign; and in the case where the winker lever 5 is at an anticlockwise position with respect to the lever base acceleration (a1s), the real displacement angle (θle) described above is denoted by a plus sign. However, a construction is not always limited to this. For example, it is also recommended to employ a construction in which: in the case where the winker lever 5 is at an anticlockwise position with respect to the lever base acceleration (a1s), the real displacement angle (θle) described above is denoted by a minus sign; and in the case where the winker lever 5 is at a clockwise position with respect to the lever base acceleration (a1s), the real displacement angle (θle) described above is denoted by a plus sign.

Further, in the real displacement angle calculation processing in S63 is calculated a real displacement angle (θmo) formed by a vector of the mobile base acceleration (a2s), which is stored in the learning result accumulation part 337, and a vector of the mobile real acceleration, which is acquired by the mobile acceleration acquisition processing. Here, the real displacement angle (θmo) is an absolute value having no plus sign or minus sign as in the case of the first embodiment.

In S64, the second assumed displacement angle calculation part 344 performs second assumed displacement angle calculation processing for calculating an assumed displacement angle (θleLα) obtained by subtracting an angle of a reverse sign of a left lighting position displacement angle stored in the learning result accumulation part 337 from the real displacement angle (θle) calculated by the real displacement angle calculation processing. Further, in second assumed displacement angle calculation processing in S64 is calculated an assumed displacement angle (θleRα) obtained by subtracting an angle of a reverse sign of a right lighting position displacement angle stored in the learning result accumulation part 337 from the real displacement angle (θle) calculated by the real displacement angle calculation processing.

The displacement angle (θleLα) and the displacement angle (θleRα) correspond to an assumed displacement angle calculated by the second assumed displacement angle calculation part. Hereinafter, the displacement angle (θleLα) is referred to as a left position assumed displacement angle (θleLα) and the displacement angle (θleRα) is referred to as a right position assumed displacement angle (θleRα).

In S65, the second best approximation determination part 345 determines a displacement angle the most approximate to the absolute value of the displacement angle (θmo) calculated by the real displacement angle calculation processing from among the real displacement angle (θle), which is calculated in the real displacement calculation processing, the left position assumed displacement angle (θleLα) and the right position assumed displacement angle (θleRα) which are calculated in the second assumed displacement angle calculation processing.

In S66, as the result of the second best approximation determination processing, in the case where the real displacement angle (θle) is the most approximate to the real displacement angle (θmo) (YES in S66), the routine proceeds to S67. On the other hand, in the case where the real displacement angle (θle) is not the most approximate to the real displacement angle (θmo) (NO in S66), the routine proceeds to S68. In S67, the operation position sensing part 343 senses that the position of the winker lever 5 is the neutral position.

In S68, as the result of the second best approximation determination processing, in the case where the left position assumed displacement angle (θleLα) is the most approximate to the real displacement angle (θmo) (YES in S68), the routine proceeds to S69. On the other hand, in the case where the left position assumed displacement angle (θleLα) is not the most approximate to the real displacement angle (θmo) (NO in S68), that is, in the case where the right position assumed displacement angle (θleRα) is the most approximate to the real displacement angle (θmo), the routine proceeds to S70.

In S69, the operation position sensing part 343 senses that the position of the winker lever 5 is the left lighting position. In S70, the operation position sensing part 343 senses that the position of the winker lever 5 is the right lighting position. Processing in S71 is the same as the processing in S32 of the first embodiment.

<Summary of the Embodiment 2>

In the construction of the second embodiment, the left position assumed displacement angle (θleLα) and the right position assumed displacement angle (θleRα) from the lever base acceleration (a1s) in the case where the position of the winker lever 5 is the left lighting position and the right lighting position are found not by returning a displacement vector in the case where the position of the winker lever 5 is the left lighting position and the right lighting position but by subtracting the left lighting position displacement angle and the right lighting position displacement angle.

As described in <Reason why the position of the winker lever 5 can be sensed> in the first embodiment, in the case where the direction of the acceleration caused by the running of the own vehicle is not on the turning plane and where the sensing axes of the mobile acceleration sensor 32 and the lever acceleration sensor 21 do not match with each other, an acceleration component caused by the running of the own vehicle, which is sensed by the lever acceleration sensor 21, an acceleration component corresponding to the inclination of the own vehicle, and the acceleration component corresponding to the position of the winker lever 5 are not expressed on the same plane. Hence, as compared with the construction of the first embodiment, the calculation accuracy of the displacement angle of the acceleration in the case where the position of the winker lever 5 is the left lighting position or the right lighting position and the lever base acceleration (a1s) is reduced.

However, in the construction of the second embodiment, the position of the winker lever 5 is sensed by which of the real displacement angle (θmo), the left lighting position displacement angle (θleLα), and the right lighting position displacement angle (θleRα) the real displacement angle (θle) is the most approximate to the real displacement angle (θle). Hence, even in the case where the accuracy of the left lighting position displacement angle (θleLα) and the accuracy of the right lighting position displacement angle (θleRα) are reduced, the position of the winker lever 5 can be sensed without error. Hence, the position of the winker lever 5 can be sensed also by the construction of the second embodiment.

Further, also in the construction of the second embodiment, the accelerations themselves sensed by the lever acceleration sensor 21 and the mobile acceleration sensor 32 are not made objects to be compared, but displacement amounts from the base acceleration learned under the specified conditions (that is, the real displacement angle (θmo), the real displacement angle (θle), the left lighting position displacement angle (θleLα), and the right lighting position displacement angle (θleRα)) are made objects to be compared. Hence, even if the axes of the lever acceleration sensor 21 and the mobile acceleration sensor 32 do not match, comparison can be made. Therefore, the second embodiment has an advantage of eliminating the need for matching the direction of the sensor unit 2 to the direction of the mobile terminal 3 for the purpose of matching the sensing axis of the lever accelerator sensor 21 to the sensing axis of the mobile acceleration sensor 32.

<Modified Example 1>

In the first embodiment and the second embodiment described above, the description has been made by an example in which the sensor unit 2 is fixed to the winker lever 5 whose operation position is changed in different directions from the position serving as the base such as the neutral position, but the present disclosure is not limited to this. For example, the present disclosure can be applied to the case where the sensor unit 2 is fixed to an operation member whose operation position is changed in a plurality of steps only in the same direction from the position serving as the base.

<Modified Example 2>

Here, it is also recommended to employ a construction in which in the case where the sensor unit 2 is fixed to an operation member whose operation position is changed in a plurality of steps only in the same direction from the position serving as the base and where three sensing axis of the lever acceleration sensor 21 is made to match three sensing axis of the mobile acceleration sensor 32, the real displacement angle (θle), the left lighting position displacement angle (θleLα), and the right lighting position displacement angle (θleRα) are treated as absolute values having no plus and minus signs.

(Embodiment 3)

The present disclosure is not limited to the embodiments described above but also a following third embodiment is included in the technical scope of the present disclosure. Hereinafter, the third embodiment will be described.

A vehicle operation sensing system 1 of the third embodiment is the same as the vehicle operation sensing system 1 of the first embodiment except for not sensing up to the position of a winker lever 5 but sensing whether or not the winker lever 5 is operated.

A lever acceleration sensor 21 and a mobile acceleration sensor 32 of the third embodiment are the same as the lever acceleration sensor 21 and the mobile acceleration sensor 32 of the first embodiment.

Figure 18:
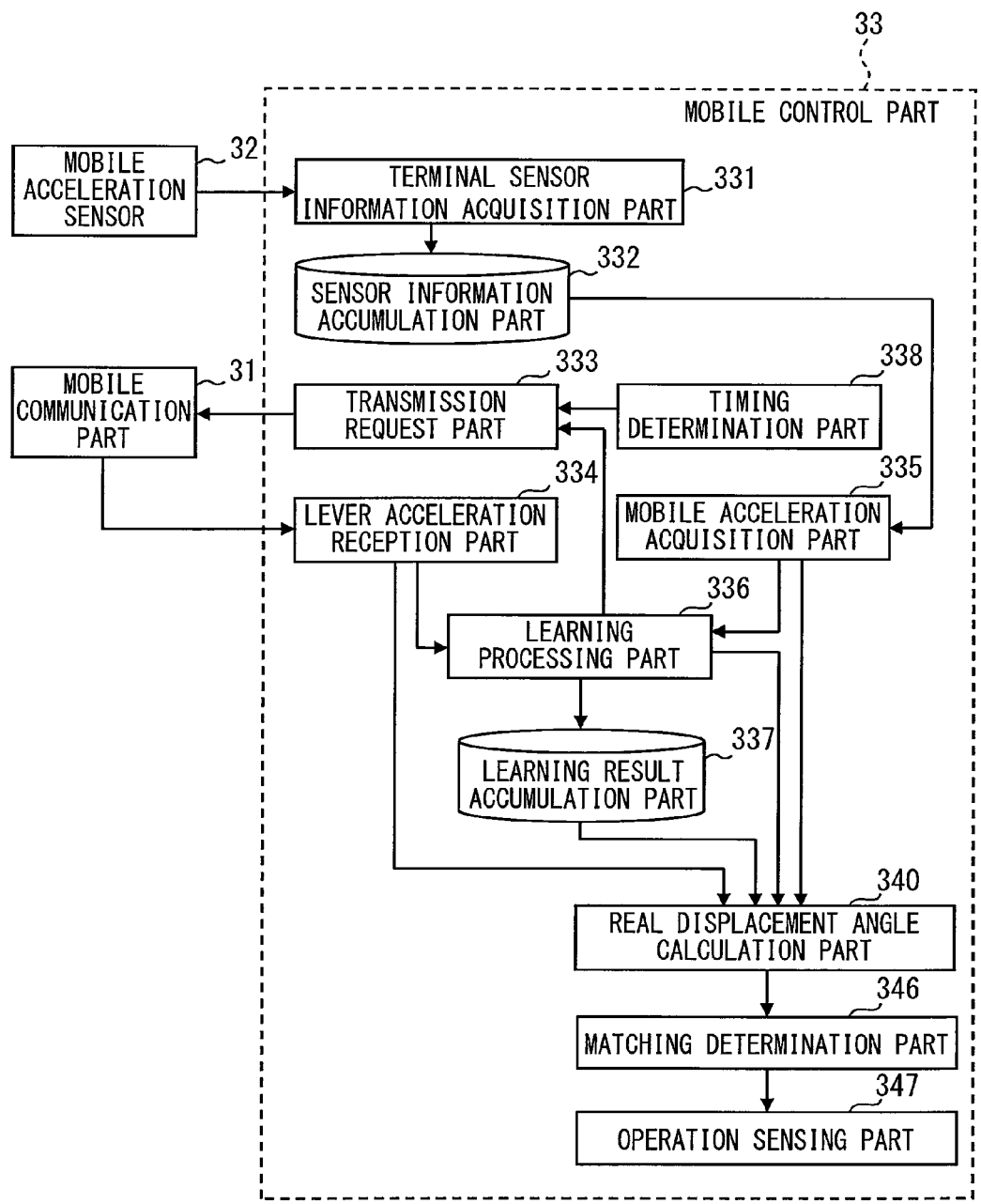
FIG. 18 is a function block diagram to show an example of a general construction of a mobile control part 33 in a third embodiment.

Further, as shown in FIG. 18, a mobile control part 33 has a terminal sensor information acquisition part 331, a sensor information accumulation part 332, a transmission request part 333, a lever acceleration reception part 334, a mobile acceleration acquisition part 335, a learning processing part 336, a learning result accumulation part 337, a timing determination part 338, a real displacement angle calculation part 340, a matching determination part 346, and an operation sensing part 347.

<Learning Processing in the Embodiment 3>

Figure 19:
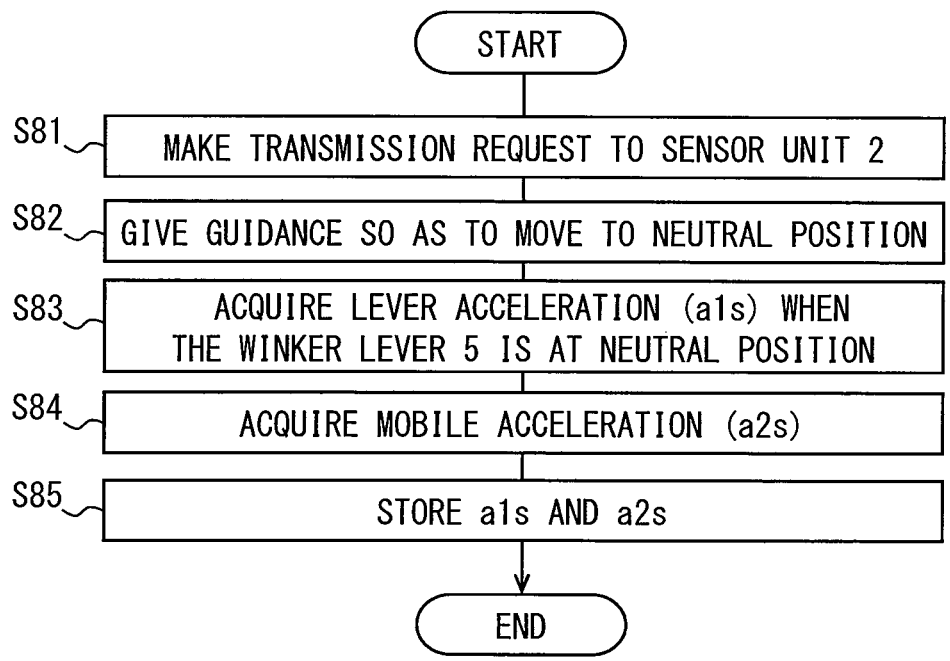
FIG. 19 is a flow chart to show an example of a flow of learning processing performed by a learning processing part 336 in the third embodiment.

In the learning processing part 336 of the third embodiment, following learning processing will be performed. Here, by the use of a flow chart shown in FIG. 19, learning processing in the learning processing part 336 in the third embodiment will be described. Processing in S81 to S85 is the same as the processing in S1 to S5 of the first embodiment.

<Operation Sensing Relating Processing in the Embodiment 3>

Figure 20:
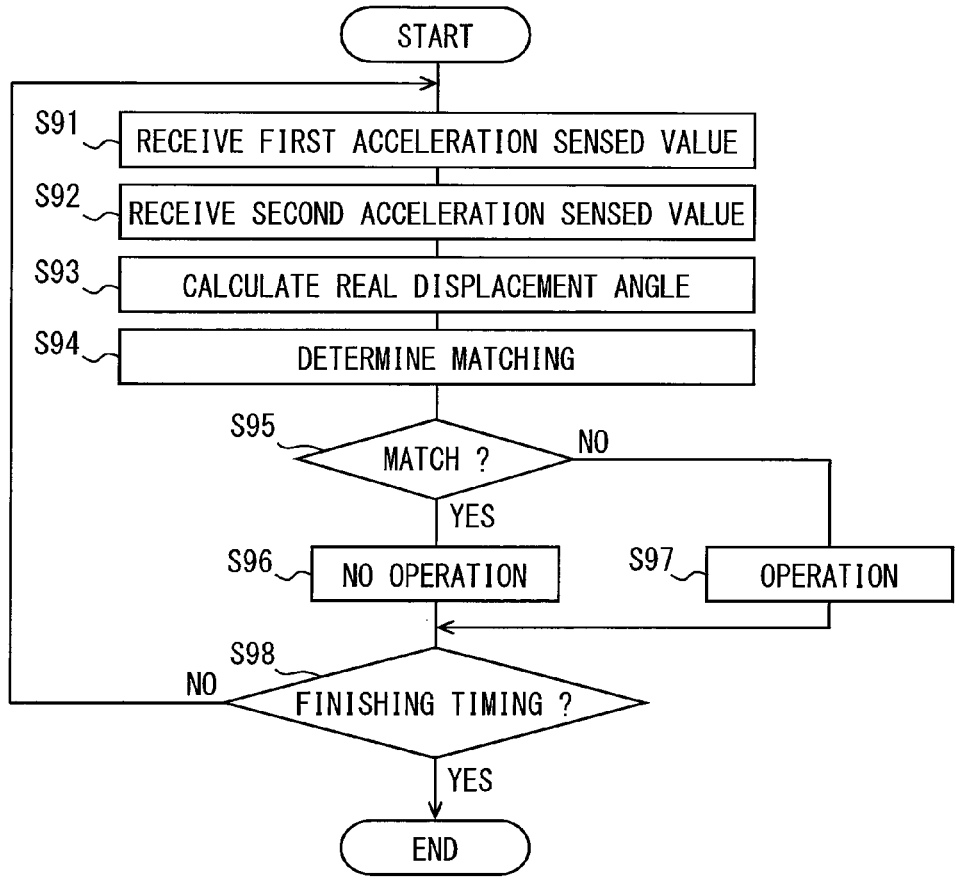
FIG. 20 is a flow chart to show an example of a flow of operation position relating processing performed by the mobile control part 33 in the third embodiment.

Here, by the use of a flow chart shown in FIG. 20, processing (hereinafter referred to as "an operation sensing relating processing") relating to sensing an operation of the winker lever 5 in the mobile control part 33 of a mobile terminal 3 in the third embodiment will be described. Also the flow chart shown in FIG. 20, like the abovementioned flow charts shown in FIG. 14 and FIG. 17, may be so constructed as to start in the case where the abovementioned learning processing is already performed and where a transmission request is made from the transmission request part 333.

First, processing in S91 and S92 is the same as the processing in S21 and S22 of the first embodiment. In S93, the real displacement angle calculation part 340 performs real displacement angle calculation processing as in the case of S24 of the first embodiment In S94, the matching determination part 346 performs matching determination processing for determining whether or not a real displacement angle ($\theta$le) calculated by the real displacement angle calculation processing matches a real displacement angle ($\theta$mo) calculated by the real displacement angle calculation processing. Here, it is also recommended to employ a construction in which when the real displacement angle ($\theta$le) and the real displacement angle ($\theta$mo) are the same values, it is determined that the real displacement angle ($\theta$le) matches the real displacement angle ($\theta$mo). Alternatively, it is also recommended to employ a construction in which when a difference between the real displacement angle ($\theta$le) and the real displacement angle ($\theta$mo) is not more than a specified value, it is determined that the real displacement angle ($\theta$le) matches the real displacement angle ($\theta$mo).

In S95, in the case where it is determined by the matching determination processing that the real displacement angle ($\theta$le) matches the real displacement angle ($\theta$mo) (YES in S95), the routine proceeds to S96. On the other hand, in the case where it is determined by the matching determination processing that the real displacement angle ($\theta$le) does not match the real displacement angle ($\theta$mo) (NO in S95), the routine proceeds to S97. In S96, the operation sensing part 347 senses that the winker lever 5 is not operated. Further, in S97, the operation sensing part 347 senses that the winker lever 5 is operated.

In S98, in the case where this is a finishing timing of the operation sensing relating processing (YES in S98), the flow is finished. On the other hand, in the case where this is not the finishing timing of the operation sensing relating processing (NO in S98), the routine returns to S91 and the flow is repeatedly performed. As an example of the finishing timing of the operation sensing relating processing is a timing when mobile control part 33 makes the abovementioned stop request or a timing when the abovementioned application program is finished.

<Summary of the Embodiment 3>

Each of the lever acceleration sensor 21 and the mobile acceleration sensor 32 is a three-axis acceleration sensor for sensing an acceleration at least in a gravitational acceleration direction. Hence, while the own vehicle runs, an acceleration as a sensing result of each of the lever acceleration sensor 21 and the mobile acceleration sensor 32 includes not only the gravitational acceleration but also an acceleration component caused by the behavior of the own vehicle. Hence, by making the sensing result of the mobile acceleration sensor 32 of the mobile terminal 3, which is placed or fixed in the vehicle, the object to comparison, an acceleration component caused by the behavior of the own vehicle can be eliminated and hence a difference in the acceleration between in the case where the winker lever 5 is at the neutral position and in the case where the winker lever 5 is at a position other than the neutral position can be determined. Therefore, it can be sensed with higher accuracy whether or not the winker lever 5 is operated.

<Modified Example 3>

In the construction of the third embodiment, the case where the winker lever 5 is at the left lighting position or the right lighting position is not considered but only the case where the winker lever 5 is at the neutral position is considered. In the case where the winker lever 5 is displaced from the neutral position to the left lighting position or the right lighting position, its displacement vector is in a relationship in which the displacement vector cannot be expressed on a plane. Hence, in the case of considering the case where the winker lever 5 is at the left lighting position or the right lighting position, a three-axis lever acceleration sensor 21 is required. However, in the third embodiment, it is not necessary to consider the case where the winker lever 5 is at the left lighting position or the right lighting position. Hence, the third embodiment may be so constructed as to use a two-axis lever acceleration sensor 21 capable of sensing at least the gravitational acceleration direction. Further, in the case where the two-axis lever acceleration sensor 21 is used, in order to make it possible to compare a real displacement angle ($\theta$le) with a real displacement angle ($\theta$mo), it is necessary to make two sensing axes of the lever acceleration sensor 21 match two sensing axes of the mobile acceleration sensor 32.

<Modified Example 4>

The embodiments 1 to 3 described above present the following problem: that is, depending on the arrangement of the mobile terminal 3 and the sensor unit 2, accuracy with which the position of the winker lever 5 or the presence or absence of the operation of the winker lever 5 is determined while the own vehicle turns is reduced. The details of the problem will be described in the following.

Figure 21:
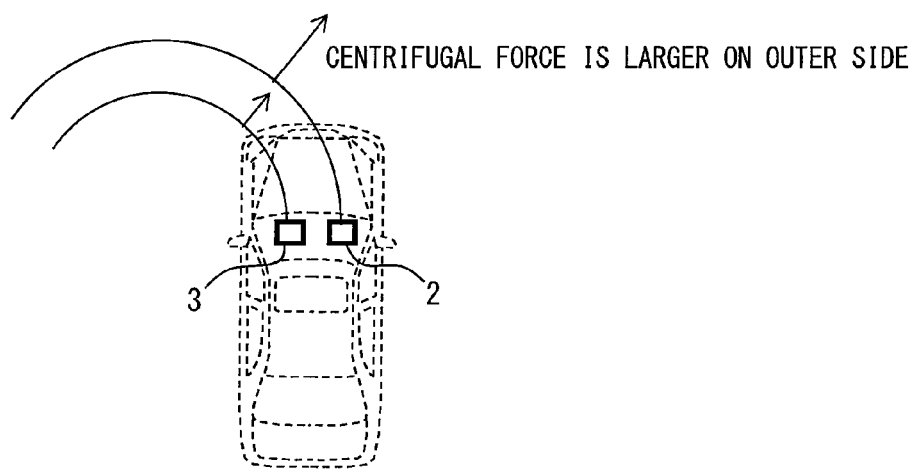
FIG. 21 is a schematic illustration to show a centrifugal force generated by the turn of own vehicle.

While the vehicle turns, a stronger centrifugal force is applied to a portion at a position remoter from the pivot of turning in the vehicle. Hence, in the case where the own vehicle turns and where a distance from the pivot of turning is different between the mobile terminal 3 and the sensor unit 2, as shown in FIG. 21, a difference is caused between the centrifugal force applied to the mobile terminal 3 and the centrifugal force applied to the sensor unit 2.

Here, by the use of FIG. 22, an example will be described in which the sensing accuracy of the position of the winker lever 5 is reduced by the difference between the centrifugal force applied to the mobile terminal 3 and the centrifugal force applied to the sensor unit 2. In the example shown in FIG. 22, it is assumed that the winker lever 5 is at the neutral position and that while the own vehicle runs, the centrifugal force applied to the sensor unit 2 is larger than the centrifugal force applied to the mobile terminal 3.

In the case where the winker lever 5 is at the neutral position, when the centrifugal force is not taken into account, as described above in the embodiments 1 to 3, the real displacement angle (θle) of the lever real acceleration from the lever base acceleration (a1s) is supposed to be equal to the real displacement angle (θmo) of the mobile real acceleration from the mobile base acceleration (a2s).

Figure 22:
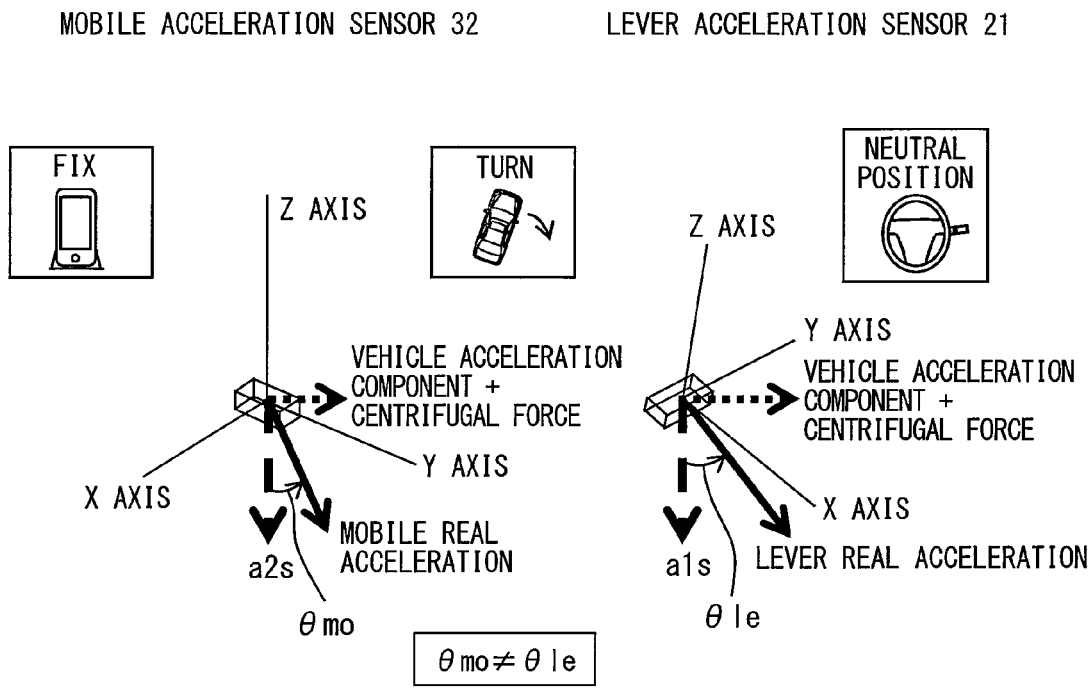
FIG. 22 is a schematic illustration to show an example of a problem caused by the centrifugal force generated by the turn of own vehicle.

However, when the centrifugal force applied to the sensor unit 2 becomes larger than the centrifugal force applied to the mobile terminal 3, as shown in FIG. 22, a difference between the vector of the lever real acceleration sensed by the lever acceleration sensor 21 and the vector of the mobile real acceleration sensed by the mobile acceleration sensor 32 is increased by the difference of the centrifugal force. Then, by this difference between the vectors, the real displacement angle (θle) of the lever real acceleration from the lever base acceleration (a1s) is separated from the real displacement angle (θmo) of the mobile real acceleration from the mobile base acceleration (a2s). As a result, in some cases, the problem might to be caused that the case where although the winker lever 5 is at the neutral position, it cannot be sensed that the winker lever 5 is at the neutral position.

As a construction for solving the problem, a modified example 4 will be described in the following. Here, for convenience of description, parts having the same functions as the parts shown in the drawings used for the prior embodiments will be denoted by the same reference symbols and their descriptions will be omitted.

A vehicle operation sensing system 1 of the modified example 4 is the same as the vehicle operation sensing system 1 of the embodiments 1 to 3 except that the mobile control part 33 further includes a difference calculation part 348 and a threshold value determination part 349 and that the processing performed by the operation position sensing part 343 is different in some parts from the processing performed by the operation sensing part 347.

<Mobile Terminal Control Part 33 in the Modified Example 4>

Figure 23:
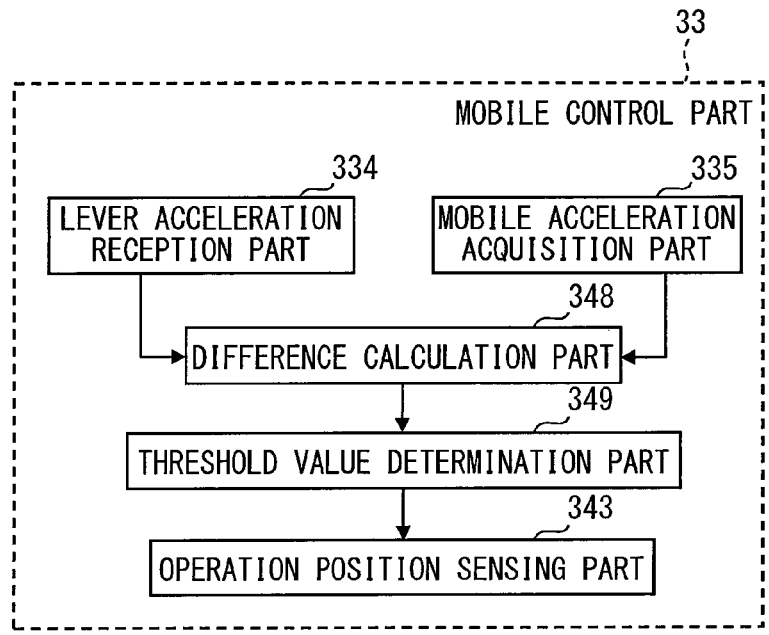
FIG. 23 is a diagram to show a construction necessary for describing a modified example 4 of a construction included by the mobile control part 33.

The mobile control part 33 in the modified example 4 will be described. Here, for the sake of convenience, a case where the modified example 4 is employed in the first embodiment will be described by the use of FIG. 23. In FIG. 23, of the construction of the mobile control part 33, a construction necessary for the description of the modified example 4 will be shown.

The mobile control part 33 in the modified example 4, as described above, has not only the construction described in the first embodiment but also the difference calculation part 348 and the threshold value determination part 349.

The difference calculation part 348 calculates a difference between an absolute value of the lever acceleration and an absolute value of the mobile acceleration (hereinafter referred to as "an absolute value difference") from the lever acceleration received by the lever acceleration reception part 334 and the mobile acceleration acquired by the mobile acceleration acquisition part 335. This absolute value difference corresponds to the magnitude of a difference in the vector between the lever real acceleration sensed by the lever acceleration sensor 21 and the mobile real acceleration sensed by the mobile acceleration sensor 32.

The threshold value determination part 349 determines whether or not the absolute value difference calculated by the difference calculation part 348 is not less than a threshold value and outputs a determination result to the operation position sensing part 343. The threshold value referred to here is as large a value as the absolute value difference which is considered to reduce the sensing accuracy of the position of the winker lever 5 and is an arbitrarily set value.

<Mobile Terminal Control Part 33 in the Modified Example 4>

Figure 24:
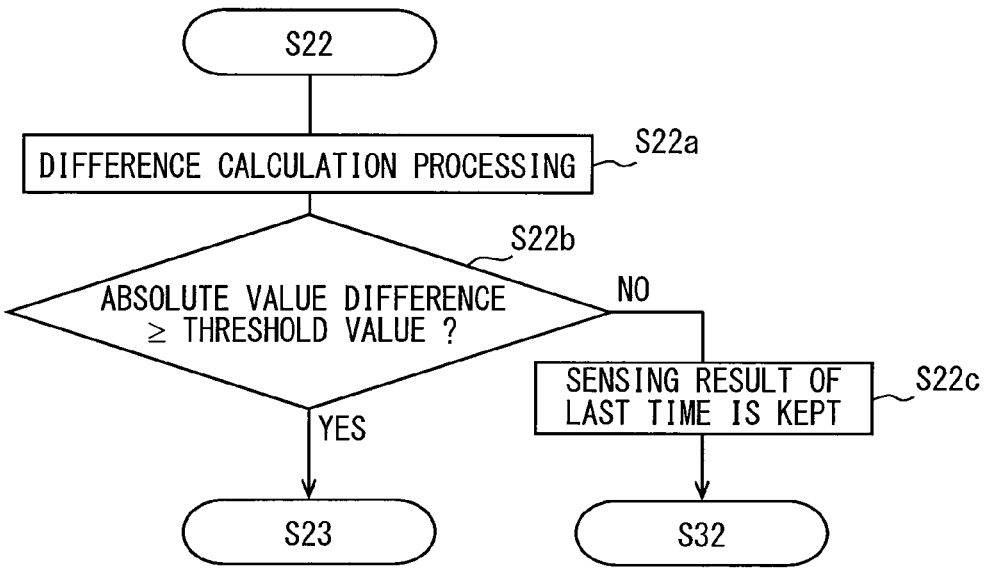
FIG. 24 is a flow chart to show an example of a flow of operation position relating processing performed by a mobile control part 33 in a first vehicle-mounted unit 200 in the modified example 4.

Subsequently, the description of operation position sensing relating processing performed by the mobile control part 33 in the modified example 4 will be described will be made by the use of a flow chart shown in FIG. 24. The flow chart shown in FIG. 24 shows the processing of S22a to S22c to be appended to the end of the processing S22 of the flow chart shown in FIG. 14, and the appended processing of S22a to S22c is extracted and shown.

First, in S22a following S22, the difference calculation part 348 calculates an absolute value difference between an absolute value of the lever acceleration and an absolute value of the mobile acceleration from the lever acceleration received in S21 and the mobile acceleration acquired in S22.

In S22b, the threshold value determination part 349 determines whether or not the absolute value difference calculated in S22a is not less than a threshold value. Then, in the case where the threshold value determination part 349 determines that the absolute value difference is not less than the threshold value (YES in S22b), the routine proceeds to S23. Then, the processing following S23 is performed, whereby the position of the winker lever 5 is sensed. On the other hand, in the case where the threshold value determination part 349 determines that the absolute value difference is less than the threshold value (NO in S22b), the routine proceeds to S22c.

In S22c, the operation position sensing part 343 makes the position of the winker lever 5, which is sensed by the operation position sensing relating processing of the last time, the position of the winker lever 5, which is sensed by the operation position sensing relating processing of this time, and then the routine proceeds to S32. According to the flow chart shown in FIG. 24, only the position of the winker lever 5 sensed by the operation position sensing relating processing of the time in which the threshold value determination part 349 determines that the absolute value difference calculated in S22a is less than the threshold value is made the position of the winker lever 5. Hence, the processing of S22c can be paraphrased by processing for keeping a sensing result of the position of the winker lever 5 sensed by the operation position sensing relating processing of the last time in which the threshold value determination part 349 determines that the absolute value difference calculated in S22a is less than the threshold value.

<Summary of the Modified Example 4>

According to the modified example 4, in the case where the absolute value difference between the lever acceleration and the mobile acceleration is not less than the threshold value and where it is hence thought that the sensing accuracy of the position of the winker lever 5 is reduced, there is kept the sensing result of the position of the winker lever 5 sensed by the operation position sensing relating processing of the last time in which the threshold value determination part 349 determines that the absolute value difference is less than the threshold value. The sensing result of the position of the winker lever 5 sensed by the operation position sensing relating processing of the time in which the absolute value difference is less than the threshold value is the sensing result when the sensing accuracy is not reduced and hence is less likely to be sensed erroneously.

Hence, according to the modified example 4, even under the circumstance in which the absolute value difference between the lever acceleration and the mobile acceleration is not less than the threshold value and in which the sensing result of the position of the winker lever is hence thought to be reduced, there is kept the sensing result of the position of the winker lever 5, which is sensed by the operation position sensing relating processing of the time in which the threshold value determination part 349 determines that the absolute value difference is less than the threshold value, which hence makes it possible to prevent the position of the winker lever 5 from being erroneously sensed.

<Modified Example 5>

In the modified example 4 is shown a construction in which in the case where the threshold value determination part 349 determines that the absolute value difference is not less than the threshold value, the operation position sensing part 343 keeps the sensing result of the position of the winker lever 5, which is sensed by the operation position sensing relating processing of the last time in which the threshold value determination part 349 determines that the absolute value difference is less than the threshold value. However, a construction to be employed is not limited to this construction. For example, it is also recommended to employ a construction in which there are kept the real displacement angle (θmo) and the real displacement angle (θmo), which are calculated by the real displacement angle calculation processing of S24 in the operation position sensing relating processing of the last time in which the threshold value determination part 349 determines that the absolute value difference is not less than the threshold value, and the left position assumed displacement angle (θleL) and the right position assumed displacement angle (θleR), which are calculated by the first assumed displacement angle calculation processing. In this case, by the use of the real displacement angle (θmo), the real displacement angle (θmo), the left position assumed displacement angle (θleL), and the right position assumed displacement angle (θleR), which are kept, the processing of S26 to S31 is performed to thereby sense the position of the winker lever 5.

The real displacement angle (θmo) and the real displacement angle (θmo), which are calculated by the real displacement angle calculation processing of the last time in which the threshold value determination part 349 determines that the absolute value difference is not less than the threshold value, and the left position assumed displacement angle (θleL) and the right position assumed displacement angle (θleR), which are calculated by the first assumed displacement angle calculation processing, are values used for sensing when the sensing accuracy of the position of the winker lever 5 is not reduced. Hence, when these values are used, the possibility that the position of the winker lever 5 is erroneously sensed is low.

Hence, according to also the modified example 5, under the circumstance in which the absolute value difference between the lever acceleration and the mobile acceleration is not less than the threshold value and in which it is hence thought that the sensing result of the position of the winker lever is reduced, there are kept the values, which are calculated by the real displacement angle calculation processing of the time in which the threshold value determination part 349 determines that the absolute value difference is less than the threshold value, and the values, which are calculated by the first assumed displacement angle calculation processing in the operation position sensing relating processing. Therefore, as in the case of the modified example 4, it is possible to prevent the position of the winker lever 5 from being erroneously sensed.

<Modified Example 6>

In the modified example 4 has been described the case where the modified example 4 is employed in the first embodiment, but a construction to be employed is not limited to this case. For example, it is also recommended to employ a construction in which the modified example 4 is employed in the second embodiment (hereinafter referred to as "a modified example 6").

Also the modified example 6, as in the case of the modified example 4, may include the construction shown in FIG. 23 and may employ a construction in which in the case where the threshold value determination part 349 determines that the absolute value difference is not less than the threshold value, the operation position sensing part 343 keeps the sensing result of the position of the winker lever 5 sensed by the operation position sensing relating processing of the last time in which the threshold value determination part 349 determines that the absolute value difference is less than the threshold value. Further, the operation position sensing relating processing in the modified example 6 may be so constructed as to append the same processing as the processing in S22a to S22c to the end of the processing of S62 in the flow chart shown in FIG. 17.

According to this modified example 6, as in the case of the modified example 4, in the case where the absolute value difference between the lever acceleration and the mobile acceleration is not less than the threshold value, there is kept the sensing result of the position of the winker lever 5, which is sensed by the operation position sensing relating processing of the time in which the threshold value determination part 349 determines that the absolute value difference is less than the threshold value. Hence, it is possible to prevent the position of the winker lever 5 from being erroneously sensed.

<Modified Example 7>

Figure 25:
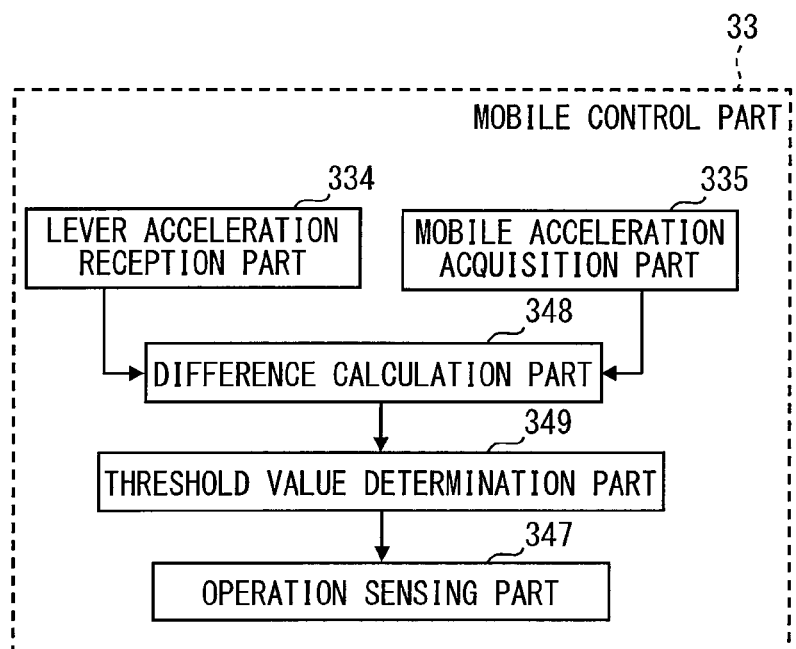
FIG. 25 is a diagram to show a construction necessary for describing a modified example 7 of a construction included by the mobile control part 33.

Further, it is also recommended to employ a construction in which the modified example 4 is used in the third embodiment (hereinafter referred to as "a modified example 7"). In the following, the modified example 7 will be described by the use of FIG. 25. In FIG. 25, of the construction included by a mobile control part 33, a construction necessary for the description of the modified example 7 will be shown.

The mobile control part 33 in the modified example 7 further includes a difference calculation part 348 and a threshold value determination part 349 in addition to the construction described in the first embodiment. The difference calculation part 348 and the threshold value determination part 349 are the same as those described in the modified example 4 and hence their detailed descriptions will be omitted.

Figure 26:
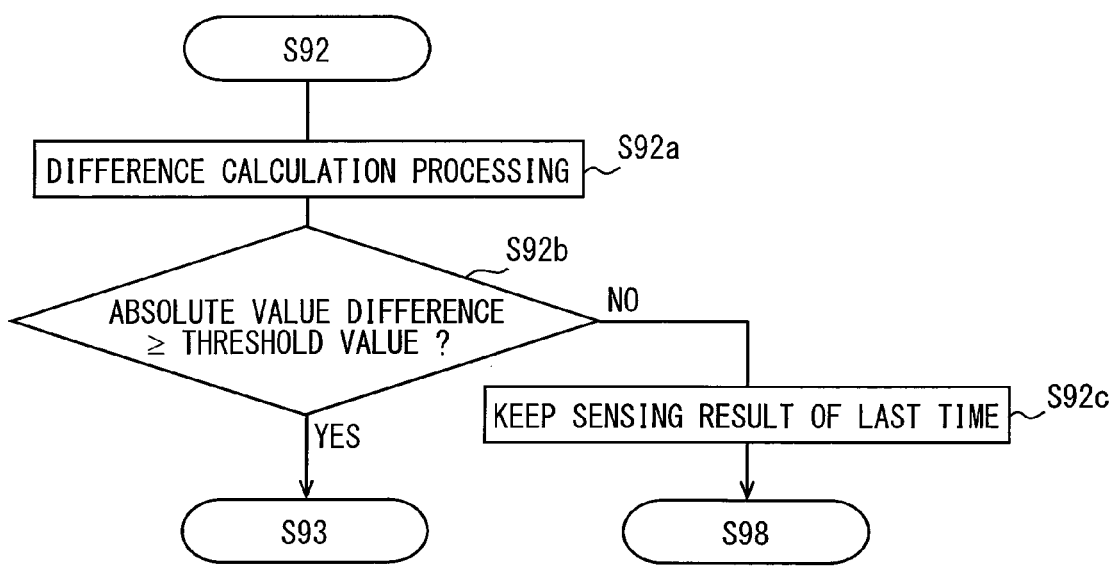
FIG. 26 is a flow chart to show an example of a flow of operation position relating processing performed by a mobile control part 33 in a first vehicle-mounted unit 200 in a modified example 7.

Subsequently, operation sensing relating processing performed by the mobile control part 33 in the modified example 7 will be described by the use of a flow chart shown in FIG. 26. The flow chart shown in FIG. 26 shows the processing of S92a to S92c to be appended to the end of the processing S92 of the flow chart shown in FIG. 20, and the appended processing of S92a to S92c is extracted and shown.

First, in S92a following S92, the difference calculation part 348 calculates an absolute value difference between an absolute value of the lever acceleration and an absolute value of the mobile acceleration from the lever acceleration received in S91 and the mobile acceleration acquired in S92.

In S92b, the threshold value determination part 349 determines whether or not the absolute value difference calculated in S92a is not less than a threshold value. Then, in the case where the threshold value determination part 349 determines that the absolute value difference is not less than the threshold value (YES in S92*b*), the routine proceeds to S93. Then, the processing following S93 is performed, whereby it is sensed whether or not the winker lever 5 is operated (that is, the presence or absence of the operation of the winker lever 5 is sensed). On the other hand, in the case where the threshold value determination part 349 determines that the absolute value difference is less than the threshold value (NO in S92*b*), the routine proceeds to S92*c*.

In S92*c*, the operation sensing part 347 makes the sensing result of the presence or absence of the operation of the winker lever 5, which is sensed by the operation sensing relating processing of the last time, the sensing result of the presence or absence of the operation of the winker lever 5, which is sensed by the operation sensing relating processing of this time, and then the routine proceeds to S98. According to the flow chart shown in FIG. 26, only the sensing result of the presence or absence of the operation of the winker lever 5, which is sensed by the operation position sensing relating processing of the time in which the threshold value determination part 349 determines that the absolute value difference calculated in S92*a* is less than the threshold value, is made the sensing result of the presence or absence of the operation. Hence, the processing of S92*c* can be paraphrased by processing for keeping the sensing result of the presence or absence of the operation, which is sensed by the operation sensing relating processing of the last time in which the threshold value determination part 349 determines that the absolute value difference calculated in S92*a* is less than the threshold value.

<Summary of the Modified Example 7>

According to the modified example 7, in the case where the absolute value difference between the lever acceleration and the mobile acceleration is not less than the threshold value and where it is hence thought that the sensing accuracy of the presence or absence of the operation of the winker lever 5 is reduced, there is kept the sensing result of the presence or absence of the operation of the winker lever 5, which is sensed by the operation sensing relating processing of the last time in which the threshold value determination part 349 determines that the absolute value difference is less than the threshold value. The sensing result of the presence or absence of the operation of the winker lever 5, which is sensed by the operation sensing relating processing of the last time in which the threshold value determination part 349 determines that the absolute value difference is less than the threshold value, is the sensing result when the sensing accuracy is not reduced and hence has a low possibility of being erroneously sensed.

Hence, according to the modified example 7, even under the circumstance in which the absolute value difference between the lever acceleration and the mobile acceleration is not less than the threshold value and in which it is hence thought that the sensing accuracy of the presence or absence of the operation of the winker lever 5 is reduced, there is kept the sensing result of the presence or absence of the operation of the winker lever 5, which is sensed by the operation sensing relating processing of the time in which the threshold value determination part 349 determines that the absolute value difference is less than the threshold value, which hence makes it possible to prevent the presence or absence of the operation of the winker lever 5 from being erroneously sensed.

<Modified Example 8>

It is also recommended to employ a construction in which in the modified example 6, there are kept the real displacement angle ($\theta$mo) and the real displacement angle ($\theta$mo), which are calculated by the real displacement angle calculation processing of S63 in the operation position sensing relating processing of the last time in which the threshold value determination part 349 determines that the absolute value difference is less than the threshold value, and the left position assumed displacement angle ($\theta$leL$\alpha$) and the right position assumed displacement angle ($\theta$leR$\alpha$), which are calculated by the first assumed displacement angle calculation processing. In this case, the processing of S65 to S70 is performed by the use of the real displacement angle ($\theta$mo), the real displacement angle ($\theta$mo), the left position assumed displacement angle ($\theta$leL$\alpha$) and the right position assumed displacement angle ($\theta$leR$\alpha$), which are kept, whereby the position of the winker lever 5 is sensed.

According to also the modified example 8, in the case where the absolute value difference between the lever acceleration and the mobile acceleration is not less than the threshold value, there are kept the values, which are calculated by the real displacement angle calculation processing in the operation position sensing relating processing of the time in which the threshold value determination part 349 determines that the absolute value difference is less than the threshold value, and values, which are calculated by the second assumed displacement angle calculation processing. Hence, as in the case of the modified example 5, it is possible to prevent the position of the winker lever 5 from being erroneously sensed, <Modified Example 9>

It is also recommended to employ a construction in which in the modified example 7, the real displacement angle ($\theta$mo) and the real displacement angle ($\theta$mo), which are calculated by the real displacement angle calculation processing of S93 in the operation position sensing relating processing of the last time in which the threshold value determination part 349 determines that the absolute value difference is less than the threshold value, are kept. In this case, the processing of S94 to S97 is performed by the use of the real displacement angle ($\theta$mo) and the real displacement angle ($\theta$mo), which are kept, whereby the presence or absence of the operation of the winker lever 5 is sensed.

The real displacement angle ($\theta$mo) and the real displacement angle ($\theta$mo), which are calculated by the real displacement angle calculation processing of the time in which the threshold value determination part 349 determines that the absolute value difference is less than the threshold value, are values used for sensing when the accuracy of sensing the presence or absence of the operation of the winker lever 5 is not reduced. Hence, when these values are used, a possibility of erroneously sensing the presence or absence of the operation of the winker lever 5 is low.

Hence, according to also the modified example 9, even under the circumstance in which the absolute value difference between the lever acceleration and the mobile acceleration is not less than the threshold value and in which it is hence thought that the accuracy of sensing of the presence or absence of the operation of the winker lever 5 is reduced, there are kept the values calculated by the real displacement angle calculation processing in the operation sensing relating processing of the time in which the threshold value determination part 349 determines that the absolute value difference is less than the threshold value. Therefore, as in the case of the modified example 7, it is possible to prevent the presence or absence of the operation of the winker lever 5 from being erroneously sensed.

<Modified Example 10>

In the embodiments described above has been shown a construction in which the fixture sensor is provided in the same device as the vehicle operation sensing unit, but a construction to be employed is not limited to this construction. For example, it is also recommended to employ a construction in which the fixture sensor and the vehicle operation sensing unit are provided in different devices.

<Modified Example 11>

In the embodiments described above has been shown a construction in which the mobile terminal 3 is used as the vehicle operation sensing unit, but a construction to be employed is not limited to this construction. For example, it is also recommended to employ a construction in which in place of the mobile terminal 3, a vehicle-mounted device such as a car navigation device is used as the vehicle operation sensing unit.

<Modified Example 12>

In the embodiments described above has been shown a construction in which the sensor unit 2 senses the acceleration generated according to the position of the winker lever 5 and identifies the position of the winker lever 5, but a construction to be employed is not limited to this construction. For example, it is also recommended to employ a construction in which the present disclosure is applied to an operation member other than the winker lever 5, wherein the operation member has one end fixed to the vehicle and wherein when the operation member is operated, the operation member has the other end turned with a fulcrum at the one end and has the position of the other end displaced in the gravitational acceleration direction. It is desired that a range in which the other end of the operation member can be moved is less than 360 degrees.

As an example, it is also recommended to employ a construction in which the present disclosure is applied to a shift lever provided in such a way that when the lever is operated, the position of the lever is displaced at least in the gravitational acceleration direction. In the case where the present disclosure is applied to the shift lever described above, the shift lever is so constructed that a shift position senses a position such as a forward position or a backward position.

In the embodiments described above, for example, the processing of S28, S30, S31, S67, S69, S70, S96, and S97 corresponds to the operation sensing part.

The flow chart or the processing of the flow chart described in this application is constructed of a plurality of sections (or referred to as "steps") and each section is expressed, for example, as S100. Further, each section can be divided into a plurality of subsections. On the other hand, a plurality of sections can be combined into one section. Further, each section constructed in this manner can be referred to as a device, a module, or a means.

The present disclosure has been described on the basis of embodiments. However, it should be understood that the present disclosure is not limited to the embodiments and structures thereof. The present disclosure includes various modified examples and modifications within an equivalent scope. In addition, various combinations and modes, and other combinations and modes including only an element, more than the element, or less than the element in addition to the various combinations and modes shall be included within the spirit and scope of the present disclosure.

The invention claimed is:

1. A vehicle operation sensing system comprising:
    an operation sensor as an acceleration sensor having two or more axes, the operation sensor being fixed to an operation member, and sensing an acceleration generated in the operation member at least in a gravitational acceleration direction, the operation member having one end fixed to a vehicle and another end, a position of the other end being displaced in the gravitational acceleration direction when the operation member is operated about the one end as a fulcrum from a position when the operation member is not operated;
    a fixture sensor as an acceleration sensor having two or more axes, the fixture sensor being used at a position unchanging part of the vehicle and sensing an acceleration generated in the vehicle at least in the gravitational acceleration direction; and
    a vehicle operation sensing unit including a processor, the vehicle operation sensing unit having an operation sensing part that senses an operation of the operation member by using a sensing result of the fixture sensor for an object to be compared with a sensing result of the operation sensor.

2. The vehicle operation sensing system according to claim 1, wherein the operation sensor is fixed in such a way that a movable range of the
    position of the other end with respect to the one end fixed to the vehicle as the fulcrum is less than 360 degrees.

3. The vehicle operation sensing system according to claim 1,
    wherein the vehicle operation sensing unit has a learning processing part previously storing an operation base acceleration vector and a fixture base acceleration vector, the operation base acceleration vector being a sensing result of the operation sensor, which is sensed by the operation sensor when the operation member is not operated, the fixture base acceleration vector being a sensing result of the fixture sensor, which is sensed by the fixture sensor when the operation member is not operated, and
    wherein the operation sensing part compares a displacement of an acceleration vector sensed by the operation sensor with respect to the operation base acceleration vector and a displacement of an acceleration vector sensed by the fixture sensor with respect to the fixture base acceleration vector previously stored in the learning processing part, thereby sensing an operation of the operation member.

4. The vehicle operation sensing system according to claim 3,
    wherein the operation member has not only a position when the operation member is not operated but also a plurality of operation positions, and
    wherein the operation sensing part compares not only the di placemen of the acceleration vector sensed by the operation sensor with respect to the operation base acceleration vector previously stored in the learning processing part but also a displacement of the acceleration vector in a case where the operation member is assumed to be at each of the plurality of operation positions with a displacement of an acceleration vector sensed by the fixture sensor with respect to the fixture base acceleration vector previously stored in the learning processing part, thereby sensing an operation position of the operation member.

5. The vehicle operation sensing system according to claim 4,
    wherein the learning processing part previously stores not only the operation base acceleration vector and the fixture base acceleration vector but also each displacement vector corresponding to a displacement of an acceleration vector in a case where the operation member is displaced to each operation position from a position when the operation member is not operated, wherein the vehicle operation sensing unit includes:

a real displacement angle calculation part calculating an operation displacement angle and a fixture displacement angle, the operation displacement angle being an angle defined between the operation base acceleration vector and the acceleration vector sensed by the operation sensor, the fixture displacement angle being an angle defined between the fixture base acceleration vector and the acceleration vector sensed by the fixture sensor;

an assumed vector determination part determining an assumed vector obtained by displacing the acceleration vector sensed by the operation sensor by a reverse direction of the displacement vector of each operation position previously stored in the learning processing part;

a first assumed displacement angle calculation part calculating an assumed displacement angle that is as an angle defined between the operation base acceleration vector and the assumed vector determined by the assumed vector determination part; and a first best approximation determination part determining which of the operation displacement angle calculated by the real displacement angle calculation part and each assumed displacement angle calculated by the first assumed displacement angle calculation part is the most approximate to the fixture displacement angle calculated by the real displacement angle calculation part, and wherein the operation sensing part senses an operation position of the operation member according to a determination result of the first best approximation determination part.

6. The vehicle operation sensing system according to claim 4, wherein the operation member has not only the position when the operation member is not operated but also the plurality of operation positions, wherein the learning processing part previously stores not only the operation base acceleration vector and the fixture base acceleration vector but also a value of a position related displacement angle corresponding to a displacement of an acceleration vector in a case where the operation member is displaced to each of the operation positions from the position when the operation member is not operated, wherein the vehicle operation sensing unit includes:

a real displacement angle calculation part calculating an operation displacement angle that is an angle defined between the operation base acceleration vector and the acceleration vector sensed by the operation sensor, and a fixture displacement angle that is an angle defined between the fixture base acceleration vector and the acceleration vector sensed by the fixture sensor;

a second assumed displacement angle calculation part calculating an assumed displacement angle obtained by subtracting an angle of a reverse sign of the position related displacement angle of each operation position previously stored in the learning processing part from the operation displacement angle calculated by the real displacement angle calculation part; and a second best approximation determination part determining which of the operation displacement angle calculated by the real displacement angle calculation part and each assumed displacement angle calculated by the second assumed displacement angle calculation part is the most approximate to the fixture displacement angle calculated by the real displacement angle calculation part, and wherein the operation sensing part senses an operation position of the operation member according to a determination result of the second best approximation determination part.

7. The vehicle operation sensing system according to claim 3, wherein the vehicle operation sensing unit includes:

a real displacement angle calculation part calculating an operation displacement angle that is defined between the operation base acceleration vector previously stored in the learning processing part and an acceleration vector sensed by the operation sensor, and a fixture displacement angle that is defined between the fixture base acceleration vector previously stored in the learning processing part and an acceleration vector sensed by the fixture sensor; and a match determination part determining whether or not the operation displacement angle calculated by the real displacement calculation part matches the fixture displacement angle, and wherein in a case where the match determination part determines that the operation displacement angle matches the fixture displacement angle, the operation sensing part does not sense an operation of the operation member, and wherein in a case where the match determination part determines that the operation displacement angle does not match the fixture displacement angle, the operation sensing part senses an operation of the operation member.

8. The vehicle operation sensing system according to claim 1, wherein the operation sensing part sequentially senses an operation of the operation member by using a sensing result sequentially sensed by the fixture sensor as an object to be compared with a sensing result sequentially sensed by the operation sensor, and wherein in a case where an absolute value difference between an absolute value of an acceleration vector sensed by the operation sensor and an absolute value of an acceleration vector sensed by the fixture sensor is not less than a threshold value, the operation sensing part keeps a last sensing result of an operation of the operation member, which is sensed by itself in a case where the absolute value difference is less than the threshold value.

9. The vehicle operation sensing system according to claim 1, wherein the operation sensor is fixed to a winker ever as the operation member of the vehicle.

10. The vehicle operation sensing system according to claim 1, wherein the vehicle operation sensing unit and the fixture sensor construct a vehicle operation sensing device.

11. A vehicle operation sensing unit comprising:

an operation sensing part sensing an operation of an operation member by using a sensing result by an operation sensor and a sensing result by a fixture sensor as objects to be compared, the operation member having one end fixed to a vehicle and another end a position of which is displaced in the gravitational acceleration direction when the operation member is operated about the one end as a fulcrum from a position when the operation member is not operated, wherein the operation sensor is an acceleration sensor having two or more axes, the operation sensor is fixed to the operation member and senses an acceleration generated in the operation member at least in a gravitational acceleration direction, and wherein the fixture sensor is an acceleration sensor having two or more axes, the fixture sensor is used at a position unchanging part of the vehicle and senses an acceleration generated in the vehicle at least in the gravitational acceleration direction.

12. A vehicle operation sensing device comprising:

an operation sensor as an acceleration sensor having two or more axes, the operation sensor being fixed to an operation member and sensing an acceleration generated in the operation member at least in a gravitational acceleration direction, the operation member having one end fixed to a vehicle and another end a position of which is displaced in the gravitational acceleration direction when the operation member is operated about the one end as a fulcrum from a position when the operation member is not operated; and an operation sensing part sensing an operation of the operation member by using a sensing result sensed by a fixture sensor as an object to be compared with a sensing result sensed by the operation sensor, the fixture sensor being an acceleration sensor having two or more axes, the fixture sensor being used at a position unchanging part of the vehicle and sensing an acceleration generated in the vehicle at least in the gravitational acceleration direction.

13. The vehicle operation sensing unit according to claim 11, wherein the operation sensor is fixed in such a way that a movable range of the position of the other end with respect to the one end fixed to the vehicle as the fulcrum is less than 360 degrees.

14. The vehicle operation sensing device according to claim 12, wherein the operation sensor is fixed in such a way that a movable range of the position of the other end with respect to the one end fixed to the vehicle as the fulcrum is less than 360 degrees.

* * * * *